US012682467B2

(12) United States Patent (10) Patent No.: US 12,682,467 B2
Nozaki et al. (45) Date of Patent: Jul. 14, 2026

(54) MOTION DATA GENERATION DEVICE, MOTION DATA GENERATION METHOD, AND RECORDING MEDIUM

(71) Applicant: NEC Corporation, Tokyo (JP)

(72) Inventors: Yoshitaka Nozaki, Tokyo (JP);
Kenichiro Fukushi, Tokyo (JP);
Kosuke Nishihara, Tokyo (JP);
Kentaro Nakahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 278 days.

(21) Appl. No.: 18/413,318

(22) Filed: Jan. 16, 2024

(65) Prior Publication Data

US 2024/0281984 A1 Aug. 22, 2024

(30) Foreign Application Priority Data

Feb. 20, 2023 (JP) ................................. 2023-023919

(51) Int. Cl.
*G06T 7/246* (2017.01)
*G06T 7/73* (2017.01)
(52) U.S. Cl.
CPC ................ *G06T 7/246* (2017.01); *G06T 7/73* (2017.01); *G06T 2207/10016* (2013.01); *G06T 2207/30196* (2013.01)
(58) Field of Classification Search
CPC . G06T 7/246; G06T 7/73; G06T 2207/10016; G06T 2207/30196
See application file for complete search history.

(56) References Cited

U.S. PATENT DOCUMENTS

| | | | | |
|---|---|---|---|---|
| 2012/0214594 A1* | 8/2012 | Kirovski | ............... | A63F 13/814 |
| | | | | 463/36 |
| 2020/0074678 A1* | 3/2020 | Ning | ...................... | G06V 20/42 |
| 2021/0142064 A1* | 5/2021 | Shimizu | ................ | G06V 10/80 |

FOREIGN PATENT DOCUMENTS

| | | | | |
|---|---|---|---|---|
| EP | 2372607 A2 * | 10/2011 | ......... | G01C 21/3602 |
| JP | 2006-302122 A | 11/2006 | | |
| JP | 6731532 B1 * | 7/2020 | | |

OTHER PUBLICATIONS

D. Dwibedi, et al., "Temporal Cycle-Consistency Learning", IEEE Conf. on Computer Vision and Pattern Recognition (2019), pp. 1-14.
Bo Li, Mingyi He, Xuelian Cheng, Yucheng Chen, Yuchao Dai, "Skeleton Based Action Recognition Using Translation-Scale Invariant Image Mapping and Multi-Scale Deep CNN", 2017 IEEE International Conference on Multimedia & Expo Workshops (ICMEW), 2017, pp. 1-8.

* cited by examiner

*Primary Examiner* — Pinalben Patel
(74) *Attorney, Agent, or Firm* — Sughrue Mion, PLLC

(57) ABSTRACT

Provided is a motion data generation device including an acquisition unit that acquires a plurality of pieces of motion data to be data converted, a conversion data choosing unit that groups the plurality of pieces of motion data for each motion class that is a target motion for data augmentation, a data conversion unit that sets at least one piece of the motion data grouped for the each motion class for reference data, sets at least one piece of the motion data different from the reference data among the grouped motion data for data to be converted, and generates extension motion data in which the data to be converted is synchronized with reference to motion timing of the reference data, and an output unit that outputs the generated extension motion data.

8 Claims, 24 Drawing Sheets

Fig.2

|   | 1 | 2 | 3 | 4 | 5 | 6 | 7 | ... | N |
|---|---|---|---|---|---|---|---|-----|---|
| 1 | ▨ |   |   |   |   |   |   | ... |   |
| 2 |   | ▨ |   |   |   |   |   | ... |   |
| 3 |   |   | ▨ |   |   |   |   | ... |   |
| 4 |   |   |   | ▨ |   |   |   | ... |   |
| 5 |   |   |   |   | ▨ |   |   | ... |   |
| 6 |   |   |   |   |   | ▨ |   | ... |   |
| 7 |   |   |   |   |   |   | ▨ | ... |   |
| ... | ... | ... | ... | ... | ... | ... | ... | ... | ... |
| N |   |   |   |   |   |   |   | ... | ▨ |

Figure 15:
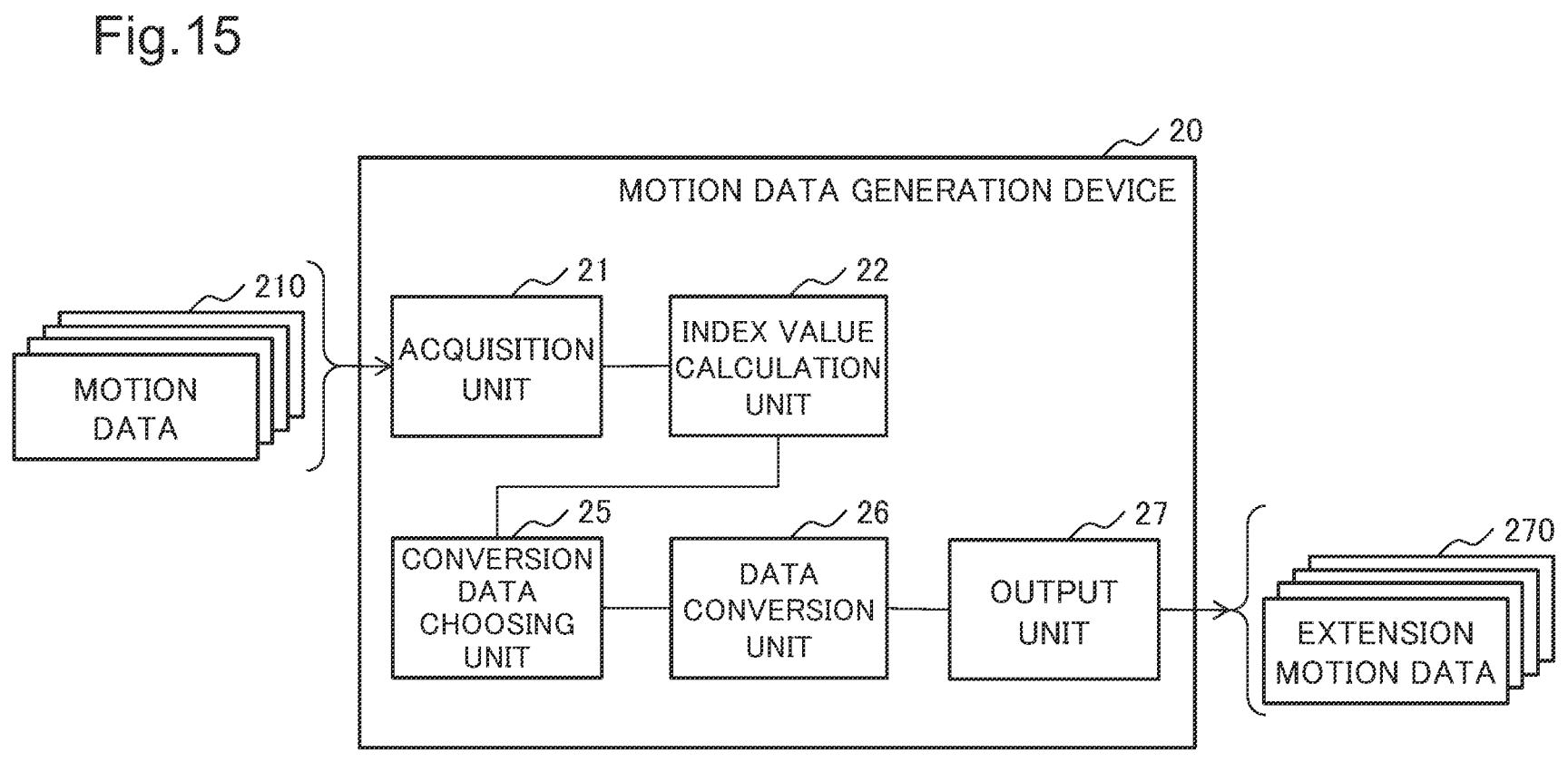

MOTION DATA GENERATION DEVICE 20

ACQUISITION UNIT 21

INDEX VALUE CALCULATION UNIT 22

CONVERSION DATA CHOOSING UNIT 25

DATA CONVERSION UNIT 26

OUTPUT UNIT 27

MOTION DATA 210

EXTENSION MOTION DATA 270

Fig.16

| | 1 | 2 | 3 | 4 | 5 | 6 | 7 | ··· | N |
|---|---|---|---|---|---|---|---|---|---|
| 1 | 1.0 | 0.9 | *0.4* | | | | | ··· | |
| 2 | 0.9 | 1.0 | *0.7* | | | | | ··· | |
| 3 | *0.4* | *0.7* | 1.0 | | | | | ··· | |
| 4 | | | | | | | | ··· | |
| 5 | | | | | | | | ··· | |
| 6 | | | | | | | | ··· | |
| 7 | | | | | | | | ··· | |
| ··· | ··· | ··· | ··· | ··· | ··· | ··· | ··· | ··· | ··· |
| N | | | | | | | | ··· | |

Fig.19

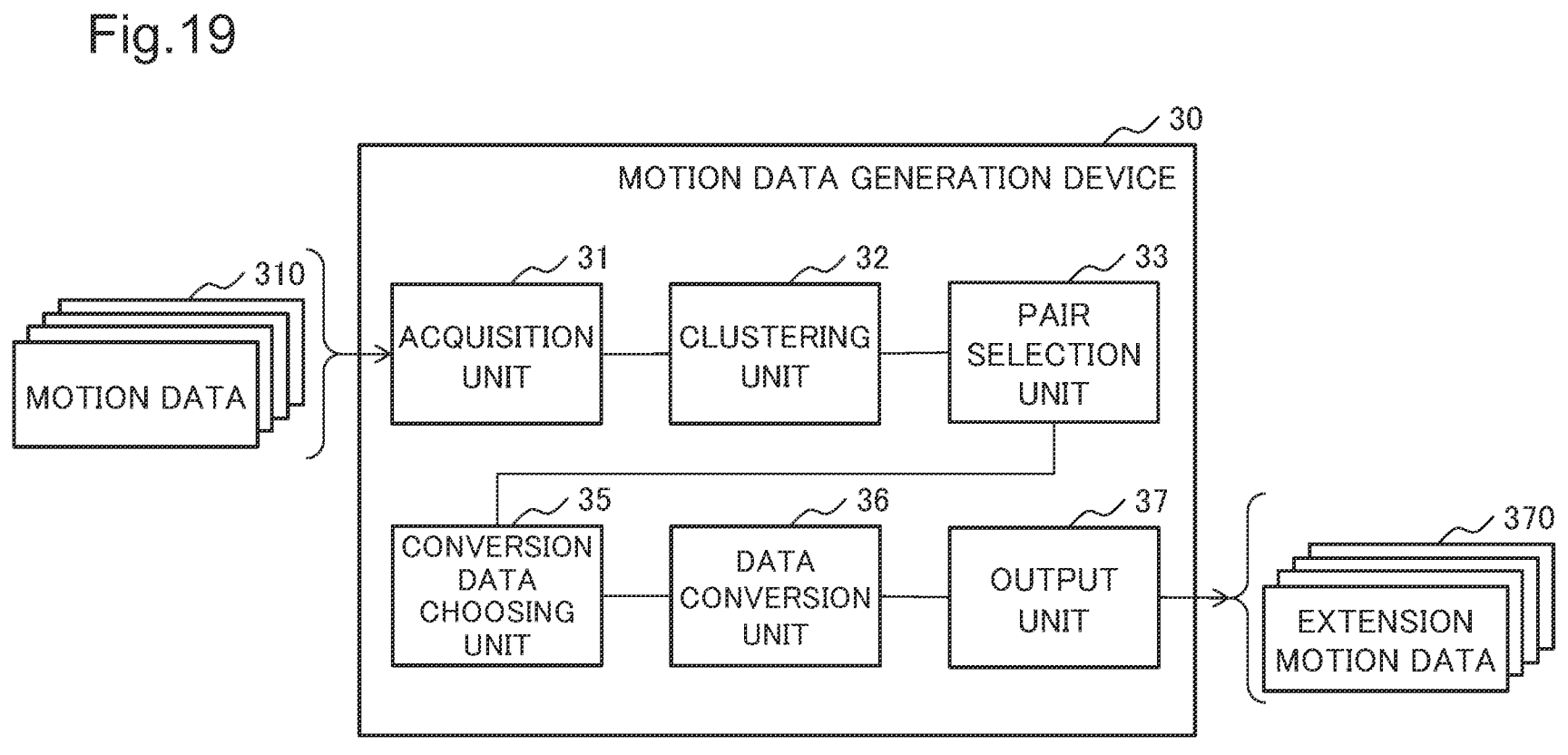

MOTION DATA GENERATION DEVICE 30

310 MOTION DATA

31 ACQUISITION UNIT

32 CLUSTERING UNIT

33 PAIR SELECTION UNIT

35 CONVERSION DATA CHOOSING UNIT

36 DATA CONVERSION UNIT

37 OUTPUT UNIT

370 EXTENSION MOTION DATA

Fig.23

MOTION DATA GENERATION DEVICE, MOTION DATA GENERATION METHOD, AND RECORDING MEDIUM

This application is based upon and claims the benefit of priority from Japanese Patent Application No. 2023-023919, filed on Feb. 20, 2022, the disclosure of which is incorporated herein in its entirety by reference.

TECHNICAL FIELD

The present disclosure relates to a motion data generation device, a motion data generation method, and a recording medium.

BACKGROUND ART

By augmenting motion data using a digital twin technique related to a human motion, a motion recognition model with accuracy equal to or higher than that in a case where a large amount of data is used can be constructed with an amount of actual measurement data smaller than that in general training. In order to stabilize training of a generative adversarial network (GAN) used in data augmentation, it is important to effectively normalize data. For example, by normalizing the common motion included in the motion data between different motion data, the training of the generative adversarial network can be stabilized. That is, by synchronizing the common motion included in the motion data between the different motion data, the training of the generative adversarial network can be stabilized.

NPL 1 (D. Dwibedi, et al., "Temporal Cycle-Consistency Learning", IEEE Conf. on Computer Vision and Pattern Recognition (2019).) discloses a self-supervised representation training method based on a task of temporal matching between videos. In the method of NPL 1, a network is trained using temporal cycle-consistency (TCC). In the method of NPL 1, common motions included in different moving images are synchronized by associating the nearest frames in the trained embedded space.

NPL 2 (Bo Li, Mingyi He, Xuelian Cheng, Yucheng Chen, Yuchao Dai, "Skeleton Based Action Recognition Using Translation-Scale Invariant Image Mapping And Multi-Scale Deep CNN", 2017 IEEE International Conference on Multimedia & Expo Workshops (ICMEW), 2017, pp. 601-604) discloses an image classification-based approach to a skeleton-based action recognition problem. NPL 2 discloses a transform scale invariant image mapping method independent of a data set. In the invariant image mapping method of NPL 2, a skeleton video called a skeleton image is converted into a color image. NPL 2 discloses a multiscale deep convolutional neural network (CNN) architecture. In the method of NPL 2, the following three are utilized in the data augmentation. The first is random rotation of three-dimensional coordinates. The second is addition of Gaussian noise. The third is cropping at random positions of a series of motion sequences.

PTL 1 (JP 2006-302122 A) discloses an exercise support system including a user terminal used by a user and an exercise support device connectable to the user terminal via a communication network. PTL 1 discloses an example in which exercise image data of a user and exercise image data of a coach are temporally synchronized and displayed on a display.

In the method of NPL 1, training for an encoder model is performed with moving image data, and the two moving image data are synchronized by associating the nearest frames in the embedded space. In the method of NPL 1, when two moving image data are synchronized, the influence of the background included in the moving image is exerted. Therefore, in the method of NPL 1, in a case where the background is greatly different between different moving images, the accuracy of synchronization may decrease. The method of NPL 1 cannot be applied to data that is not in a moving image format.

In the method of NPL 2, data is augmented by a spatial approach such as coordinate rotation, Gaussian noise addition, and random crop. According to such an approach, it is possible to implement training of a model that is hardly affected by noise and a data acquisition environment. However, since the method of NPL 2 does not include a temporal approach, the method cannot be applied to augmentation of data having different operation timings and speeds. Specifically, in a case where the number of pieces of training data is only about several tens, the method of NPL 2 cannot be applied to a data augmentation for supporting various types of test data.

In the method of PTL 1, the motion image data of the user and the motion image data of the coach are temporally synchronized with each other. The method of PTL 1 can be applied to synchronization of motion image data, but cannot be applied to augmentation of motion image data.

An object of the present disclosure is to provide a motion data generation device and the like capable of generating motion data that is data augmented in a time axis direction.

SUMMARY

A motion data generation device according to an aspect of the present disclosure includes an acquisition unit that acquires a plurality of pieces of motion data to be data converted, a conversion data choosing unit that groups the plurality of pieces of motion data for each motion class that is a target motion for data augmentation, a data conversion unit that sets at least one piece of the motion data grouped for the each motion class for reference data, sets at least one piece of the motion data different from the reference data among the grouped motion data for data to be converted, and generates extension motion data in which the data to be converted is synchronized with reference to motion timing of the reference data, and an output unit that outputs the generated extension motion data.

A motion data generation method according to an aspect of the present disclosure includes acquiring a plurality of pieces of motion data to be data converted, grouping the plurality of pieces of motion data for each motion class that is a target motion for data augmentation, setting at least one piece of the motion data grouped for the each motion class for reference data, setting at least one piece of the motion data different from the reference data among the grouped motion data for data to be converted, generating extension motion data in which the data to be converted is synchronized with reference to motion timing of the reference data, and outputting the generated extension motion data.

A program according to an aspect of the present disclosure causes a computer to execute the steps of acquiring a plurality of pieces of motion data to be data converted, grouping the plurality of pieces of motion data for each motion class that is a target motion for data augmentation, setting at least one piece of the motion data grouped for the each motion class for reference data, setting at least one piece of the motion data different from the reference data among the grouped motion data for data to be converted, generating extension motion data in which the data to be converted is synchronized with reference to motion timing of the reference data, and outputting the generated extension motion data.

BRIEF DESCRIPTION OF THE DRAWINGS

Exemplary features and advantages of the present invention will become apparent from the following detailed description when taken with the accompanying drawings in which:

FIG. 2 is a conceptual diagram for describing a method of choosing synchronization target data by the motion data generation device according to the present disclosure;

FIG. 6 is a conceptual diagram for describing an example of normalization of posture data into angle expression by the motion data generation device according to the present disclosure;

FIG. 10 is a conceptual diagram for describing motion data that is not synchronized by the motion data generation device according to the present disclosure;

FIG. 15 is a block diagram illustrating an example of a configuration of a motion data generation device according to the present disclosure;

FIG. 16 is a conceptual diagram for describing a data choosing method by the motion data generation device according to the present disclosure

FIG. 19 is a block diagram illustrating an example of a configuration of a motion data generation device according to the present disclosure;

FIG. 23 is a block diagram illustrating an example of a configuration of a training device according to the present disclosure;

EXAMPLE EMBODIMENT

Figure 1:
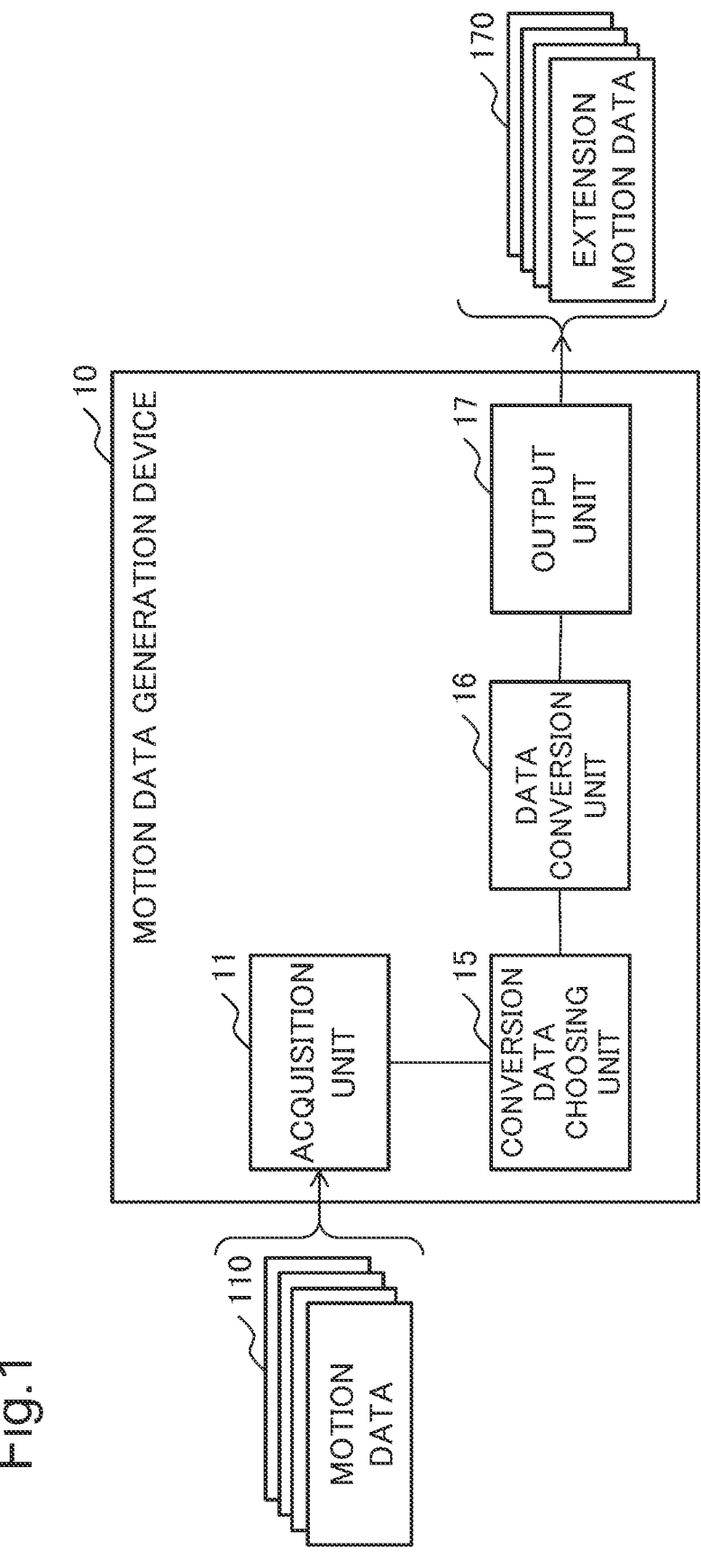
FIG. 1 is a block diagram illustrating an example of a configuration of a motion data generation device according to the present disclosure.

Example embodiments of the present invention will be described below with reference to the drawings. In the following example embodiments, technically preferable limitations are imposed to carry out the present invention, but the scope of this invention is not limited to the following description. In all drawings used to describe the following example embodiments, the same reference numerals denote similar parts unless otherwise specified. In addition, in the following example embodiments, a repetitive description of similar configurations or arrangements and operations may be omitted.

First Example Embodiment

First, a motion data generation device according to a first example embodiment will be described with reference to the drawings. The motion data generation device of the present example embodiment synchronizes motion data using an encoder trained by the method of the fourth example embodiment described later.

The present example embodiment includes portions described based on the method disclosed in NPL 1 (NPL 1: D. Dwibedi, et al., "Temporal Cycle-Consistency Learning", IEEE Conf. on Computer Vision and Pattern Recognition (2019)).

(Configuration)

FIG. 1 is a block diagram illustrating an example of a configuration of a motion data generation device 10 according to the present example embodiment. The motion data generation device 10 includes an acquisition unit 11, a conversion data choosing unit 15, a data conversion unit 16, and an output unit 17. The motion data generation device 10 acquires a plurality of pieces of motion data 110. The motion data generation device 10 augments the motion data using the plurality of pieces of motion data. The motion data generation device 10 outputs extension motion data (extension motion data 170). An extension motion data is also called an augmented motion data.

The acquisition unit 11 (acquisition means) acquires the motion data 110 to be data converted. The motion data 110 is data indicating a motion of a person who performs a target motion for data augmentation. The motion data 110 is extracted from frames constituting moving image data including an image of a person who performs a target motion for data augmentation. For example, the target motion for data augmentation includes motions such as backlash, jumping, walking, running, and stretching. A group of target motions such as backlash, jumping, walking, running, and stretching is referred to as a motion class. The motion class of the target motion is not particularly limited. For example, a flag indicating a motion class may be attached to each piece of motion data 110. When the flag indicating the motion class is attached, the motion data can be classified for each motion class using the flag.

For example, the acquisition unit 11 may acquire posture data of a person extracted from the moving image data. The posture data is a data set of position coordinates regarding the position of a representative site of a person. In other words, the posture data is data regarding the posture of the person extracted from the motion data 110. For example, a representative site of the person is a joint, an end, or the like. For example, the acquisition unit 11 may acquire posture data measured using motion capture. In a case where the acquisition unit 11 directly acquires posture data, a posture estimation unit (described later) included in the data conversion unit 16 can be omitted.

For example, the acquisition unit 11 (acquisition means) may acquire moving image data including an image of a person who performs a target motion for data augmentation. In this case, the posture estimation unit (described later) included in the data conversion unit 16 may be configured to extract a person from frames constituting the moving image data and estimate posture data of the extracted person.

The conversion data choosing unit 15 (conversion data choosing means) groups the plurality of pieces of motion data 110 acquired by the acquisition unit 11 for each motion class that is a target motion for data augmentation. The conversion data choosing unit 15 outputs the motion data 110 grouped for each motion class to the data conversion unit 16.

The data conversion unit 16 (data conversion means) acquires the motion data 110 grouped for each motion class from the conversion data choosing unit 15. The data conversion unit 16 sets one of the grouped motion data 110 for the reference data. The data conversion unit 16 sets all the motion data 110 different from the reference data among the grouped motion data 110 for the data to be converted. The data conversion unit 16 synchronizes all the data to be converted with reference to the motion timing of the reference data. The motion timing is timing at which a characteristic posture included in the operation related to the motion class appears. The motion timing is not particularly limited as long as it is timing at which the posture serving as the reference of the motion appears.

When all the data to be converted are synchronized with the reference data, the data conversion unit 16 selects the motion data 110 different from the reference data as new reference data. The data conversion unit 16 sets all the motion data 110 different from the new reference data among the grouped motion data 110 for the data to be converted. The data conversion unit 16 synchronizes all the data to be converted with reference to the motion timing of the new reference data.

In this way, the data conversion unit 16 sets all the grouped motion data 110 for the reference data. The data conversion unit 16 sets all the motion data 110 different from the reference data among the grouped motion data 110 for the data to be converted. The data conversion unit 16 synchronizes all the data to be converted with reference to the motion timing of the reference data.

FIG. 2 is a conceptual diagram for describing a combination of the motion data 110 synchronized by the data conversion process by the data conversion unit 16. One cell in the drawing indicates one piece of motion data 110. FIG. 2 illustrates a state in which N pieces of motion data with data identifiers (IDs) are combined in a brute-force manner (N is a natural number). The cells having the same combination of data IDs indicate the actually measured motion data 110. The motion data having different data IDs indicates the extension motion data 170. The data conversion unit 16 synchronizes the motion timings of the N−1 pieces of motion data 110 different from the reference data, using all the N pieces of motion data 110 as the reference data. As a result, the data conversion unit 16 generates $N^2$ pieces of extension motion data 170 including the actually measured motion data 110.

The data conversion unit 16 may set part of the motion data 110 for the reference data without setting the plurality of pieces of motion data 110 for the reference data. For example, the data conversion unit 16 may be configured to set a predetermined number of pieces of motion data 110 set in advance for the reference data. For example, the data conversion unit 16 may be configured to set a predetermined number of pieces of reference data set in advance. The number of pieces of motion data 110 set as the reference data by the data conversion unit 16 is not particularly limited.

The output unit 17 (output means) outputs the motion data (extension motion data 170) synchronized by the data conversion unit 16. The extension motion data 170 is used for training on the target motion. The extension motion data 170 is generated according to the number of motion data 110. That is, the motion data generation device generates the extension motion data 170 using the motion data 110 to augment the motion data related to the target motion.

The use of the extension motion data 170 output from the output unit 17 is not limited to the augmentation of the training target motion. The extension motion data 170 may be displayed on a screen of a terminal device browsable by the user who verifies the synchronization target motion. For example, in the extension motion data 170, the motion data 110 and the extension motion data 170 belonging to the same motion class are disposed and displayed on the screen of the terminal device. For example, in the extension motion data 170, the motion data 110 and the extension motion data 170 belonging to different motion classes related to the same person are displayed side by side on the screen of the terminal device.

[Data Conversion Unit]

Figure 3:
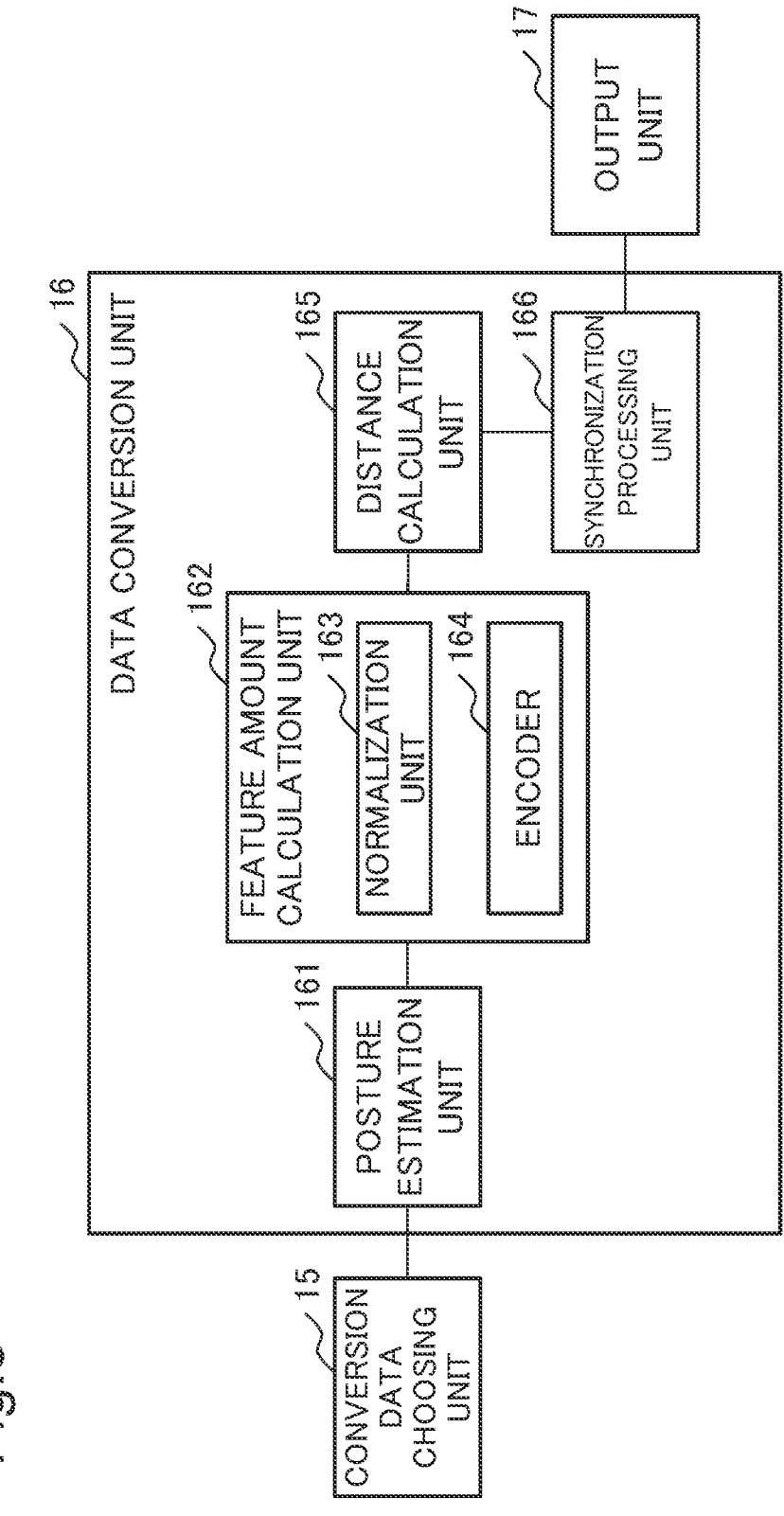
FIG. 3 is a block diagram illustrating an example of a configuration of a data conversion unit included in the motion data generation device according to the present disclosure.

Next, a detailed configuration of the data conversion unit 16 will be described with reference to the drawings. FIG. 3 is a block diagram illustrating an example of a configuration of the data conversion unit 16. The data conversion unit 16 includes a posture estimation unit 161, a feature amount calculation unit 162, a distance calculation unit 165, and a synchronization processing unit 166. The feature amount calculation unit 162 includes a normalization unit 163 and an encoder 164.

The posture estimation unit 161 (posture estimation means) extracts posture data from the motion data 110. The posture data is data indicating the posture of the person extracted from the motion data 110. For example, the posture estimation unit 161 extracts a data set indicating the position of a representative site (joint) of a person as posture data. For example, the posture estimation unit 161 estimates posture data from the motion data 110 using the deep learning model.

Figure 4:
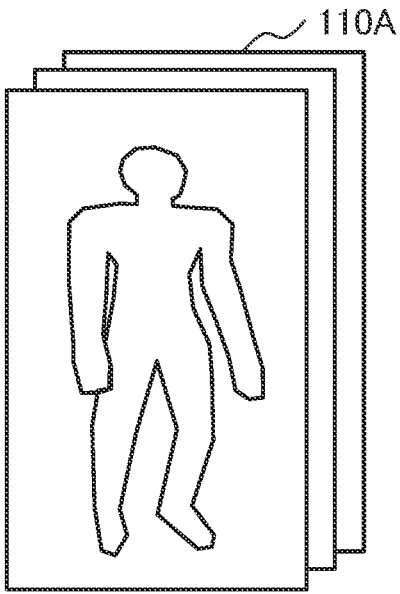
FIG. 4 is a conceptual diagram for describing motion data to be converted by the motion data generation device according to the present disclosure.

FIG. 4 is a conceptual diagram illustrating an example of motion data (motion data 110A) acquired by the data conversion unit 16. FIG. 4 illustrates an example of the motion data 110A including a person who performs the target motion for the data conversion. FIG. 4 illustrates part of a frame constituting the motion data 110A.

Figure 5:
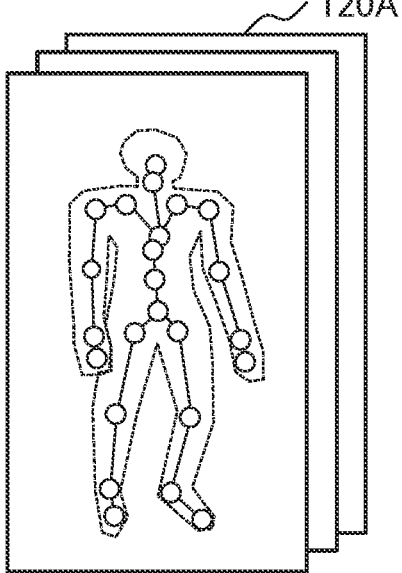
FIG. 5 is a conceptual diagram for describing posture data converted by the motion data generation device according to the present disclosure.

FIG. 5 is a conceptual diagram illustrating an example of posture data (posture data 120A) extracted from the motion data 110A. The posture estimation unit 161 estimates the position of a representative site (joint) of the person as the posture data 120A from the frames constituting the motion data 110A. In each frame, circles indicating positions of representative sites (joints) of the person are connected by connection lines. For example, the posture estimation unit 161 estimates position coordinates of joints such as a shoulder, an elbow, a wrist, a neck, a chest, a waist, a crotch, a knee, and an ankle as posture data. For example, the posture estimation unit 161 estimates position coordinates of an end such as a head, a fingertip, and a toe as posture data. For example, the posture estimation unit 161 estimates position coordinates of a joint and a site corresponding to between ends as posture data. Hereinafter, the position of a representative site of a person is expressed as a joint.

The posture estimation unit 161 may be configured to extract posture data from the moving image data. In this case, the posture estimation unit 161 extracts a person from a frame included in the moving image data. The posture estimation unit 161 estimates posture data of the extracted person. For example, the posture estimation unit 161 estimates posture data of a person extracted from the moving image data using the deep learning model. The posture estimation unit 161 estimates a spatial position of a representative site as posture data for a person extracted from the moving image data.

The feature amount calculation unit 162 (feature amount calculation means) includes the normalization unit 163 and the encoder 164. The feature amount calculation unit 162 normalizes posture data into an angle expression using the normalization unit 163. The feature amount calculation unit 162 extracts a feature amount regarding the target motion for the data conversion from the posture data normalized to the angle expression using the encoder 164.

The normalization unit 163 (normalization means) normalizes the posture data into an angle expression. The posture data includes attributes related to a physique such as lengths of arms and legs of a person who is a source from which the posture data is acquired. On the other hand, the posture data normalized to the angle expression does not include the attribute related to the physique of the person who is the source from which the posture data is acquired. The normalization unit 163 normalizes posture data into an angle expression by calculating an angle formed by connection lines connected to a joint of a person for each joint.

Figure 6:
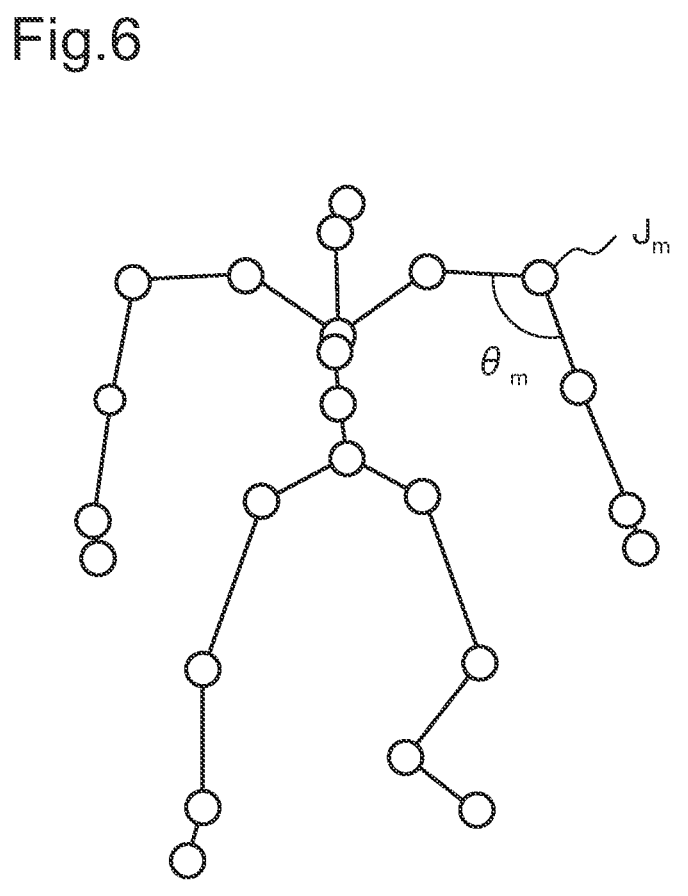

FIG. 6 is a conceptual diagram for describing an example of posture data normalized to an angle expression. The normalization unit 163 extracts a joint $J_m$ for verifying the posture of the person from the posture data estimated for each frame (m is a natural number). With respect to a plurality of joints $J_m$, the normalization unit 163 calculates a three-dimensional joint angle (Euler angle $\theta_m$) formed by two connection lines connected by the plurality of joints $J_m$. That is, the normalization unit 163 calculates a data set of Euler angles (joint angle data set) for each joint with respect to the person extracted from each frame.

The encoder 164 includes a graph convolutional network (GCN). The encoder 164 is trained on a unique embedded expression with a frame included in the motion data 110. For example, the encoder 164 performs feature extraction by training using the temporal cycle consistency (TCC) method disclosed in NPL 1. The TCC training is self-supervised training. According to the TCC training, when there is a plurality of pieces of motion data 110 including the same motion, the feature extractor can be trained without a label by calculating a loss function (cycle-back loss) to look for a relevant relationship therebetween.

The joint angle data set calculated by the normalization unit 163 is input to the encoder 164. The encoder 164 calculates a feature amount by the graph convolutional network with respect to the input joint angle data set. The encoder 164 converts a joint angle data set represented by a coordinate system of a three-dimensional space into an embedded expression. In this manner, the encoder 164 regards adjacent joints expressed in a skeleton format as a graph structure and performs graph convolution. The encoder 164 uses a graph convolutional network for a joint angle data set in a skeleton format that does not include the background of the motion data 110. Therefore, the feature amount extracted using the encoder 164 does not include the influence of the background of the motion data 110.

For example, the encoder 164 may be configured to output the feature amount according to an input of a context obtained by combining a plurality of adjacent frames. In this case, the encoder 164 uses Spatio-Temporal (ST)-GCN. For example, for 5 consecutive frames with frame number 1 to 5, the frames with frame number 1 to 3 are combined and selected as the context, the frames with frame number 2 to 4 are combined and selected as the context, and the frames with frame number 3 to 5 are combined and selected as the context. In this way, it is preferable that the contexts that are consecutive to each other share frames of the same frame number.

The distance calculation unit 165 (distance calculation means) calculates a distance between the first feature amount related to the reference data and the second feature amount related to the synchronization target data. That is, the distance calculation unit 165 calculates the distance between the feature amount calculated for each frame constituting the reference data and the feature amount calculated for each frame constituting the synchronization target data. The distance calculation unit 165 calculates the distance in the embedded space. The distance calculation unit 165 calculates a distance (absolute value of error) between the first feature amount related to the reference data and the second feature amount related to the synchronization target data in a brute-force manner. For example, the distance calculation unit 165 calculates the distance between the feature amounts using a method such as L2 norm. According to this method, the distance (degree of similarity) can be derived even when the lengths and the cycles of the time-series data are different.

For example, the distance calculation unit 165 may calculate the optimal path using a method such as dynamic time warping (DTW). In the DTW, the distance (absolute value of error) between respective points constituting the two pieces of time-series data is calculated in a brute-force manner. The shortest path among all distances calculated for each feature amount corresponds to the optimal path. According to the DTW, even when the frame lengths and the cycles of the reference data and the synchronization target data are different from each other, it is possible to calculate the degree of similarity between the frames constituting the reference data and the synchronization target data.

The synchronization processing unit 166 (synchronization processing means) calculates the optimal path for each frame based on the distance calculated by the distance calculation unit 165. The synchronization processing unit 166 synchronizes the synchronization target data with the reference data by aligning the timings of the frames connected by the optimal path. The synchronization processing unit 166 synchronizes the synchronization target data with the reference data with reference to the target motion included in the reference data. As a result, the most similar motions included in the reference data and the synchronization target data are associated. Then, the synchronization processing unit 166 synchronizes the operations included in the reference data and the synchronization target data by aligning the timings of the frames including the associated operations.

Figure 7:
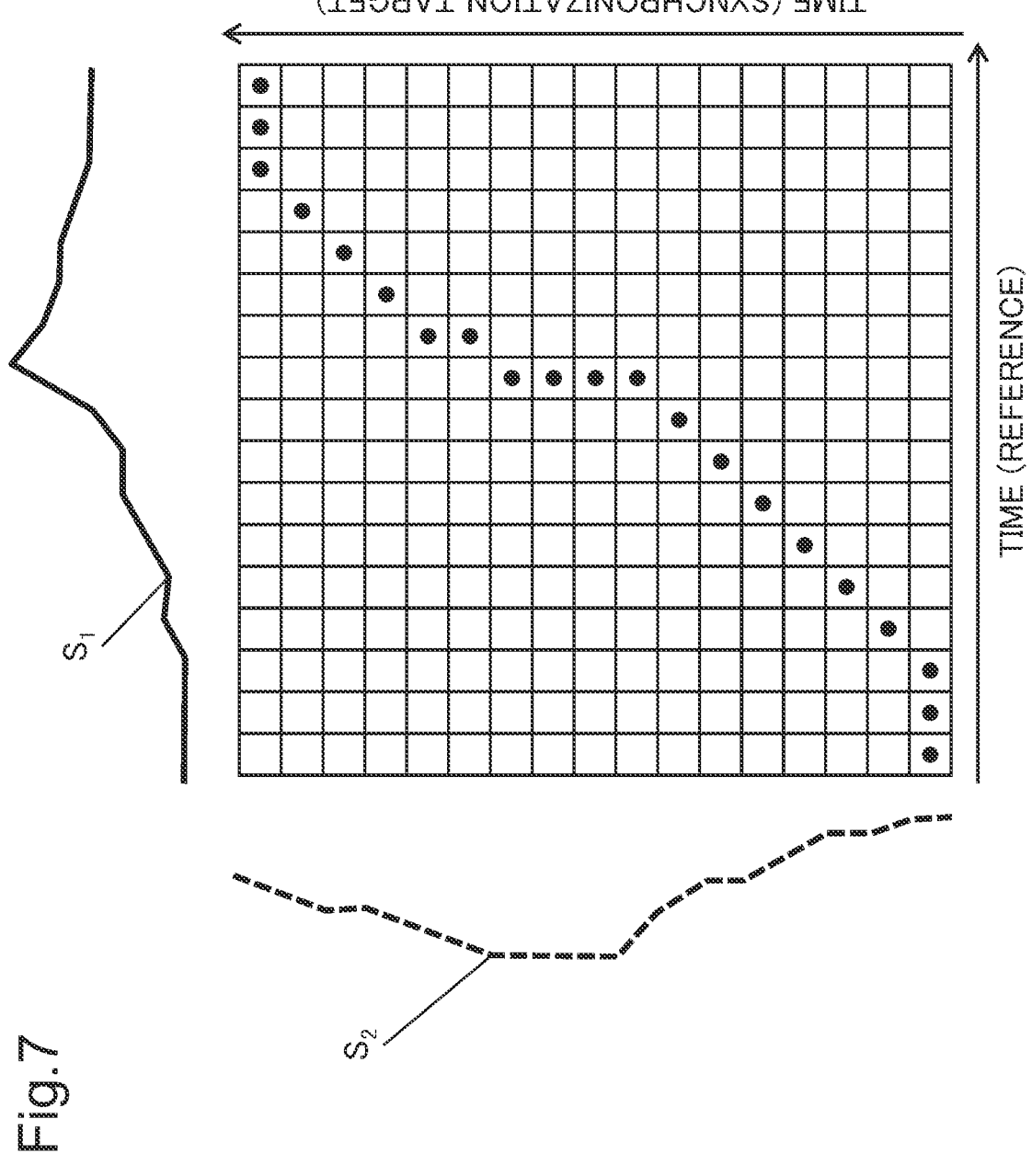
FIG. 7 is a conceptual diagram illustrating an example of a map in which the optimal path of the feature amount for each frame constituting each of the reference data and the synchronization target data calculated by the motion data generation device according to the present disclosure is associated.

FIG. 7 is a conceptual diagram illustrating an example of a map in which optimal paths of frames constituting the reference data and the synchronization target data are associated with each other. The time-series data (solid line) of the feature amount for each frame constituting the reference data is denoted as $S_1$. The time-series data (broken line) of the feature amount for each frame constituting the synchronization target data is denoted as $S_2$. In FIG. 7, the optimal path is indicated by dots in squares disposed in an array. The frame constituting the reference data and the frame constituting the synchronization target data are associated with each other at the timing of the optimal path (dot).

Figure 8:
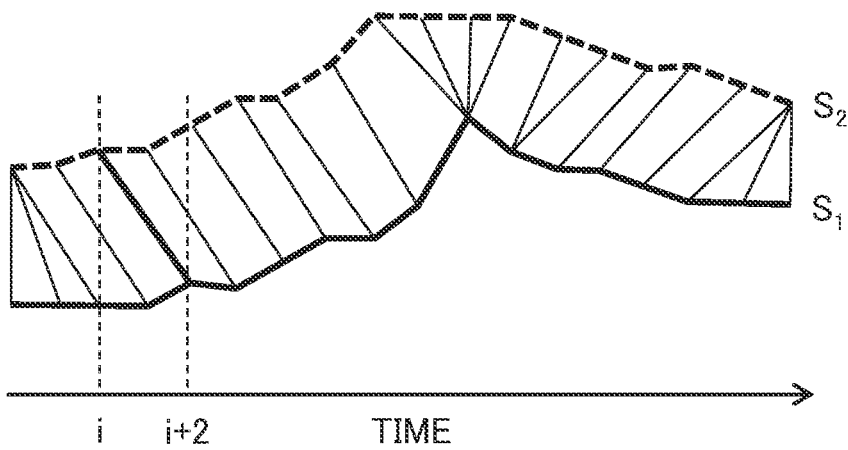
FIG. 8 is a graph illustrating a state in which the optimal paths of the frames constituting each of the reference data and the synchronization target data calculated by the motion data generation device according to the present disclosure are associated.

FIG. 8 is a graph in which the optimal paths of the frames constituting the reference data and the synchronization target data are associated with each other. FIG. 8 illustrates a state in which the optimal path for each frame is associated by a line segment. For example, the time i+2 of the time-series data $S_1$ (solid line) related to the reference data and the time i of the time-series data $S_2$ (broken line) related to the synchronization target data are connected by the optimal path.

Figure 9:
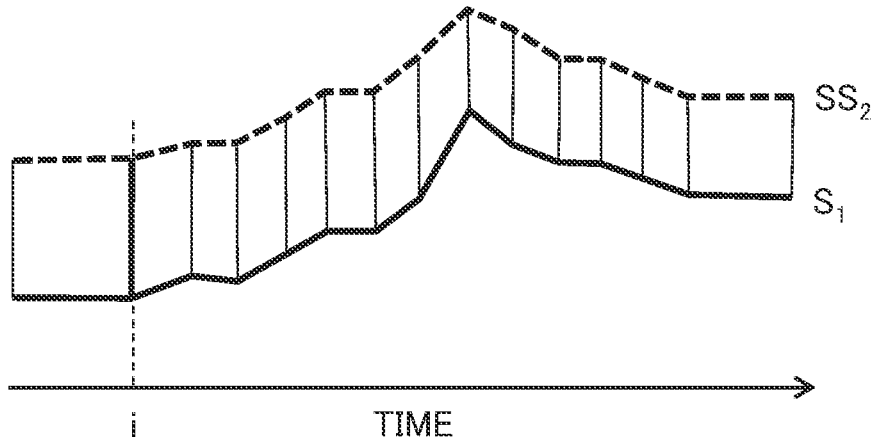
FIG. 9 is a graph illustrating a state in which the timings of the optimal paths of the frames constituting each of the reference data and the synchronization target data calculated by the motion data generation device according to the present disclosure are aligned.

FIG. 9 is a graph in which the time-series data $S_1$ (solid line) related to the reference data is associated with the time-series data $SS_2$ (broken line) of the feature amount for each frame constituting the extension motion data 170 synchronized with the reference data as a reference. As illustrated in FIG. 9, the synchronization target data is synchronized with the reference data by aligning the timings of the frames associated as the optimal path.

Figure 10:
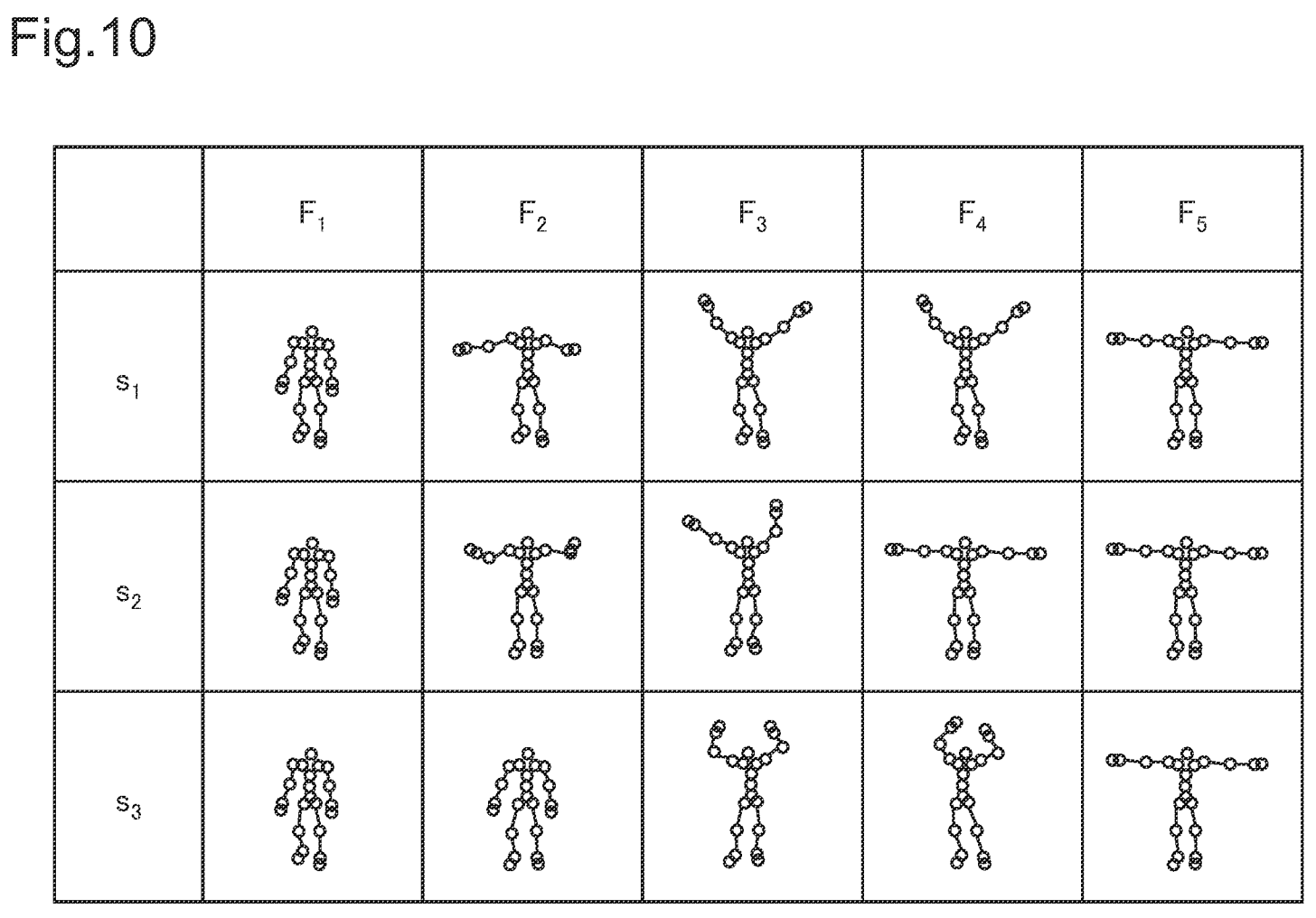

FIG. 10 is a conceptual diagram comparing motion data related to a specific motion performed by a plurality of subjects. The motion data in FIG. 10 is not normalized in the time axis direction. FIG. 10 illustrates three pieces of motion data (motion data $s_1$, motion data $s_2$, motion data $s_3$). FIG. 10 illustrates five (frame $F_1$, frame $F_2$, frame $F_3$, frame $F_4$, frame $F_5$) of a plurality of frames constituting three motion data. The operation of FIG. 10 is an operation from a state in which the hand is lowered (frame $F_1$) to a state in which the hand is raised toward the head, the hand is lowered from a position above the head, and the hand is stopped at a position on a side of a shoulder (frame $F_5$). In the case of FIG. 10, the operation is deviated in the frame $F_2$, the frame $F_5$, and the like.

Figure 11:
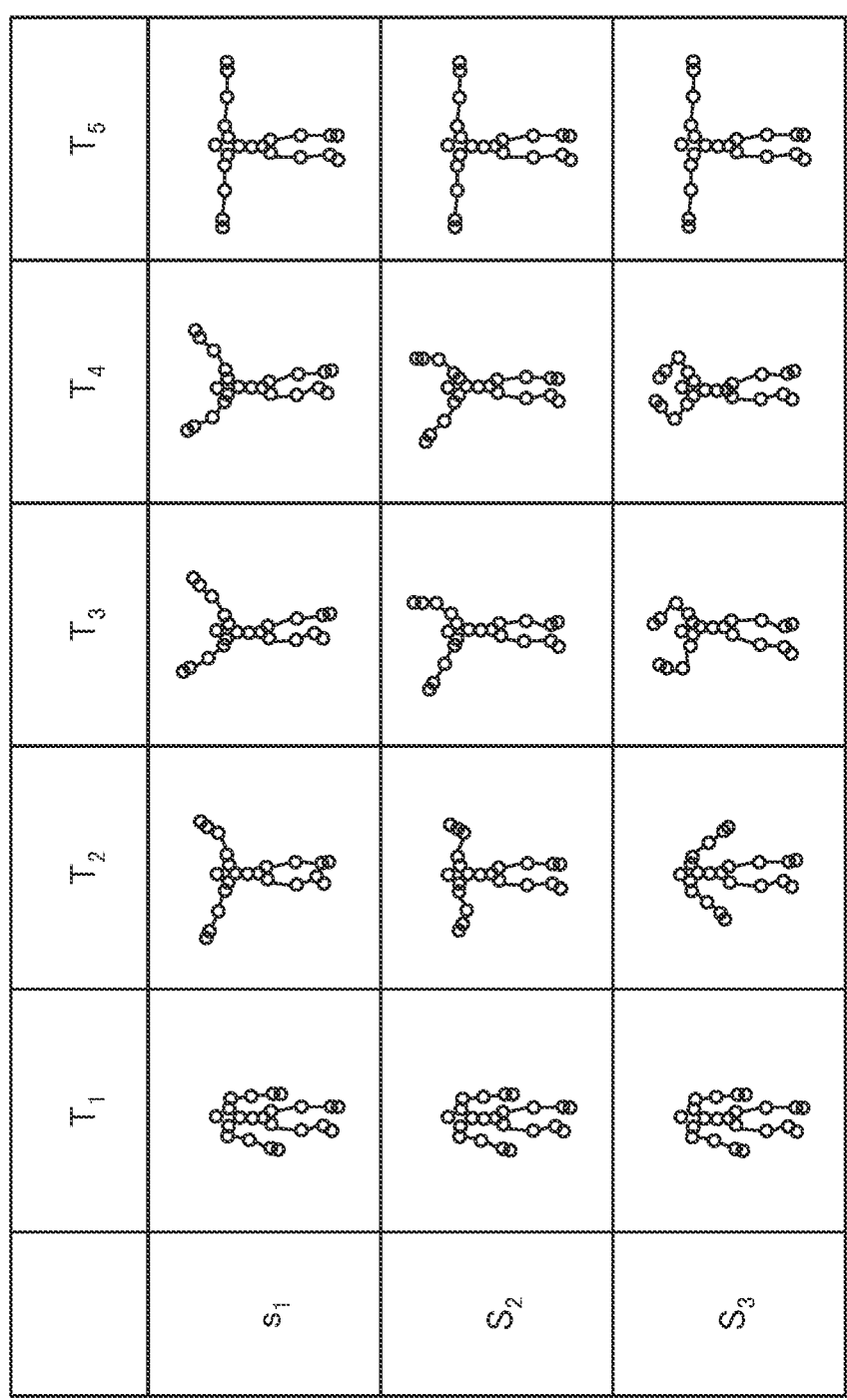
FIG. 11 is a conceptual diagram for describing motion data synchronized by the motion data generation device according to the present disclosure.

FIG. 11 is a conceptual diagram comparing motion data (motion data $S_2$, motion data $S_3$) normalized with the motion data $s_1$ as reference data with respect to a specific motion performed by a plurality of subjects. FIG. 11 illustrates five motion timings (motion timing $T_1$, motion timing $T_2$, motion timing $T_3$, motion timing $T_4$, motion timing $T_5$) from a plurality of frames constituting three motion data. The five motion timings $T_1$ to $T_5$ is related to the frames $F_1$ to $F_5$ related to the motion data $s_1$ of the reference data. In the case of FIG. 11, although there are individual differences, the motion is uniform as compared with FIG. 10. The data conversion unit 16 normalizes other motion data using not only the motion data $s_1$ but also the motion data $S_2$ and the motion data $S_3$ as reference data.

As illustrated in FIG. 11, the motion data generation device 10 generates extension motion data normalized in the time axis direction using all the motion data as reference data. Therefore, the motion data generation device 10 can generate a large amount of extension motion data normalized in the time axis direction even when the number of pieces of original motion data is small. That is, the motion data generation device 10 can generate a large amount of motion data augmented in the time axis direction using a small amount of motion data.

(Operation)

Figure 12:
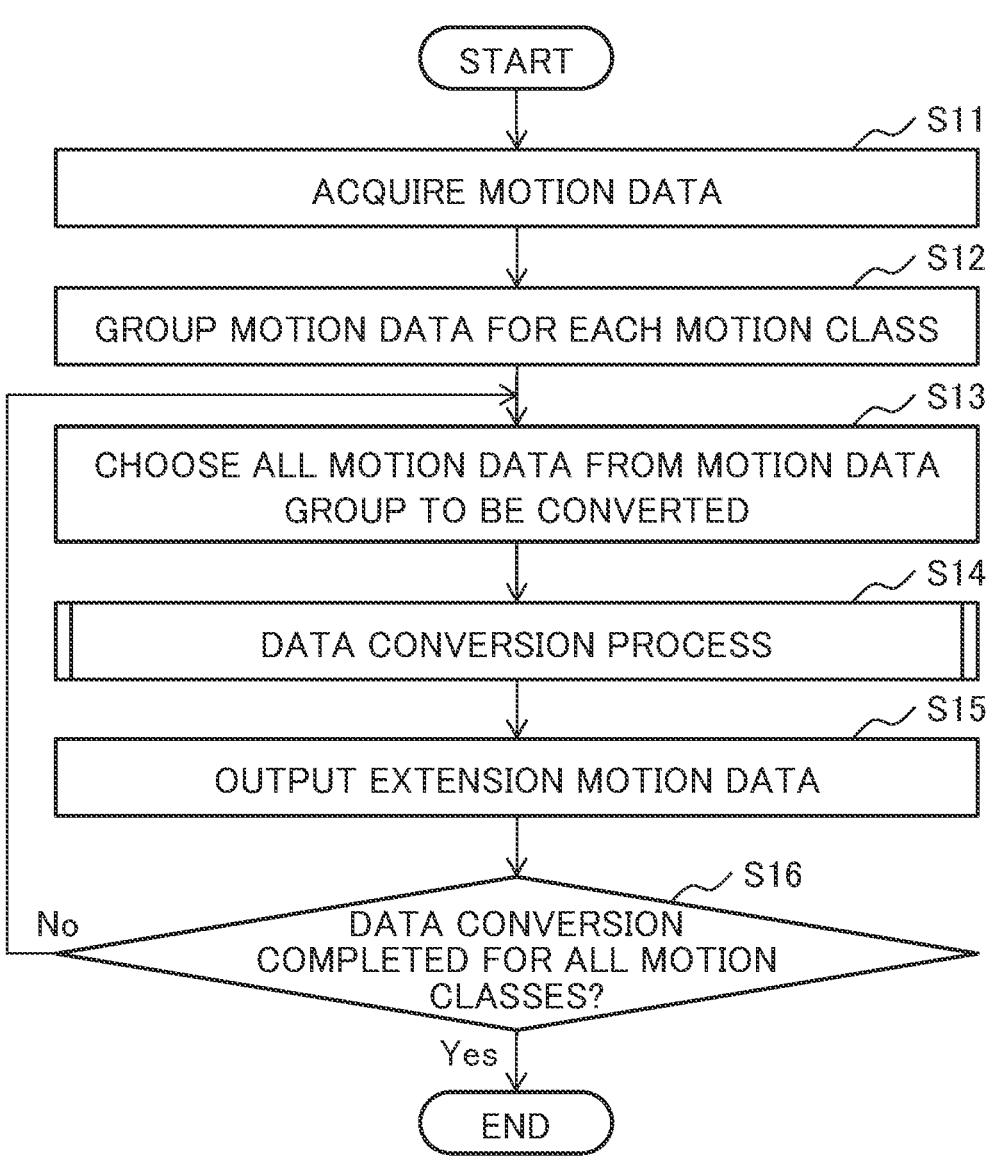
FIG. 12 is a flowchart for describing an example of the operation of the motion data generation device according to the present disclosure.

Next, the operation of the motion data generation device 10 will be described with reference to the drawings. FIG. 12 is a flowchart for describing an example of the operation of the motion data generation device 10. In the description along the flowchart of FIG. 12, the motion data generation device 10 will be described as an operation subject.

In FIG. 12, first, the motion data generation device 10 acquires motion data to be converted (step S11).

Next, the motion data generation device 10 groups the motion data for each motion class (step S12).

Next, the motion data generation device 10 chooses all pieces of motion data included in the motion data group to be converted (step S13).

Next, the motion data generation device 10 executes a data conversion process (step S14). In the data conversion process of step S14, the motion data generation device 10 synchronizes the synchronization target data with the reference data using the posture data normalized to the angle expression. The motion data generation device 10 sets all the motion data for the reference data and synchronizes the synchronization target data with the reference data. Details of the data conversion process in step S14 will be described later.

Next, the motion data generation device 10 outputs the extension motion data 170 synchronized by the synchronization process (step S15). For example, the output extension motion data 170 is used for training on the target motion. For example, the motion data generation device 10 may display the extension motion data 170 on the screen.

When the data conversion is not completed for all the motion classes (No in step $S_{16}$), the process returns to step S13. The motion data generation device 10 continues the data conversion process for the motion class for which the data conversion is not completed. When the data conversion is completed for all the motion classes (Yes in step S16), the process according to the flowchart in FIG. 12 is ended. The motion data generation device 10 may be configured to output the extension motion data 170 after the data conversion regarding all the motion classes is completed.

[Data Conversion Process]

Figure 13:
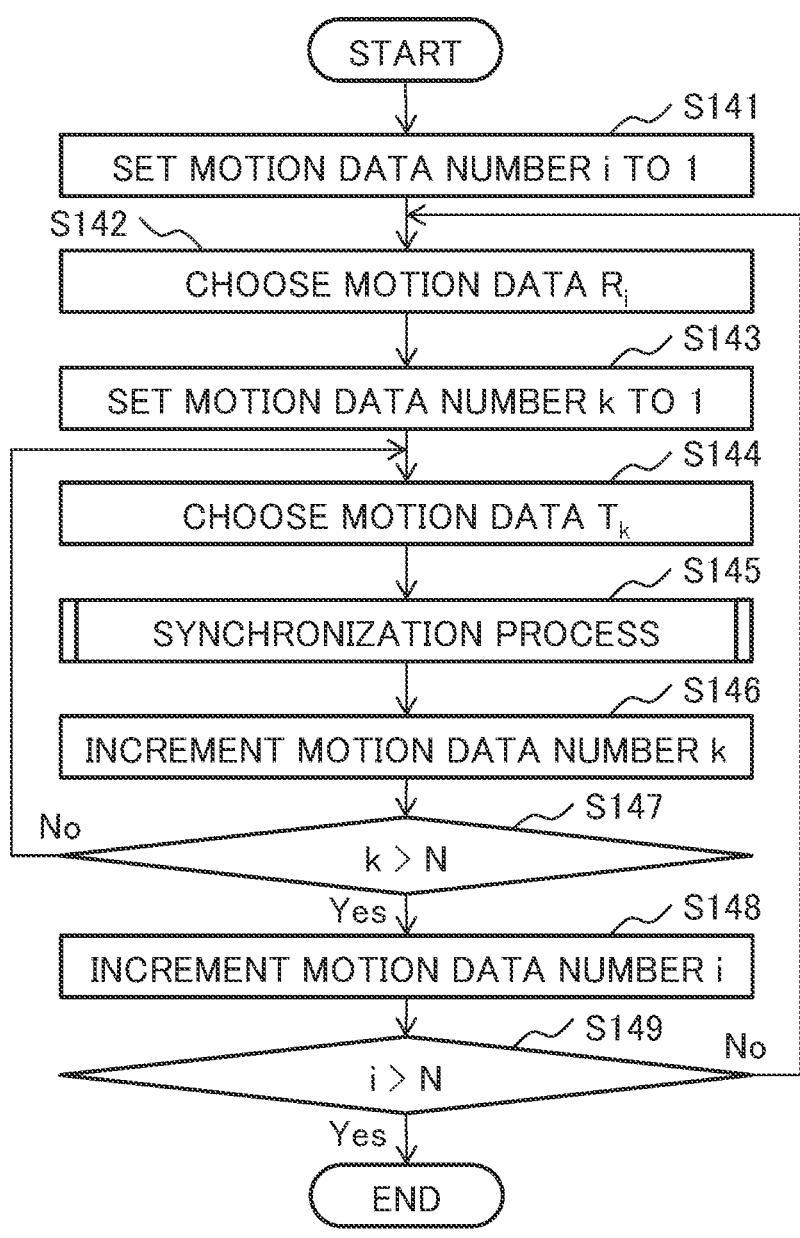
FIG. 13 is a flowchart for describing an example of a data conversion process by the motion data generation device according to the present disclosure.

Next, the data conversion process (step S14 in the flowchart of FIG. 12) by the motion data generation device 10 will be described with reference to the drawings. FIG. 13 is a flowchart for describing an example of a data conversion process by the motion data generation device 10. In the example of the flowchart of FIG. 13, a case where the total number of pieces of motion data 110 is N is exemplified. In the description along the flowchart of FIG. 13, the data conversion unit 16 included in the motion data generation device 10 will be described as an operation subject.

In FIG. 13, first, the data conversion unit 16 sets 1 to the motion data number i chosen as the reference data (step S141). The motion data number is a unique number for each of the plurality of pieces of motion data. In the example of FIG. 13, 1 to N motion data numbers are assigned to f the N pieces of respective motion data.

Next, the data conversion unit 16 chooses the motion data of the motion data number i as the reference data (step S142). The motion data of the chosen motion data number i is used as the reference data $R_1$ ($1 \leq i \leq N$).

Next, the data conversion unit 16 sets 1 to the motion data number k chosen as the synchronization target data (step S143).

Next, the data conversion unit 16 chooses the motion data with the motion data number k as the synchronization target data (step S144). The motion data of the chosen motion data number k is used as the synchronization target data $T_k$ ($1 \leq k \leq N$).

Next, the data conversion unit 16 executes a synchronization process (step S145). In the synchronization process, the data conversion unit 16 synchronizes the synchronization target data $T_k$ with the reference data $R_1$. Details of the synchronization process will be described later.

Next, the data conversion unit 16 increments the motion data number k used for choosing the synchronization target data $T_k$ (step S146).

When the motion data number k does not exceed the total number N of motion data (No in step S147), the process returns to step S144. When the motion data number k exceeds the total number N of motion data (Yes in step S147), the data conversion unit 16 increments the motion data number i chosen as the reference data (step S148).

When the motion data number i does not exceed the total number N of motion data (No in step S149), the process returns to step S142. When the motion data number i exceeds the total number N of motion data (Yes in step S149), the process proceeds to step S15 of the flowchart of FIG. 12. At this stage, $N^2$ kinds of extension motion data including N pieces of motion data are generated.

[Synchronization Process]

Figure 14:
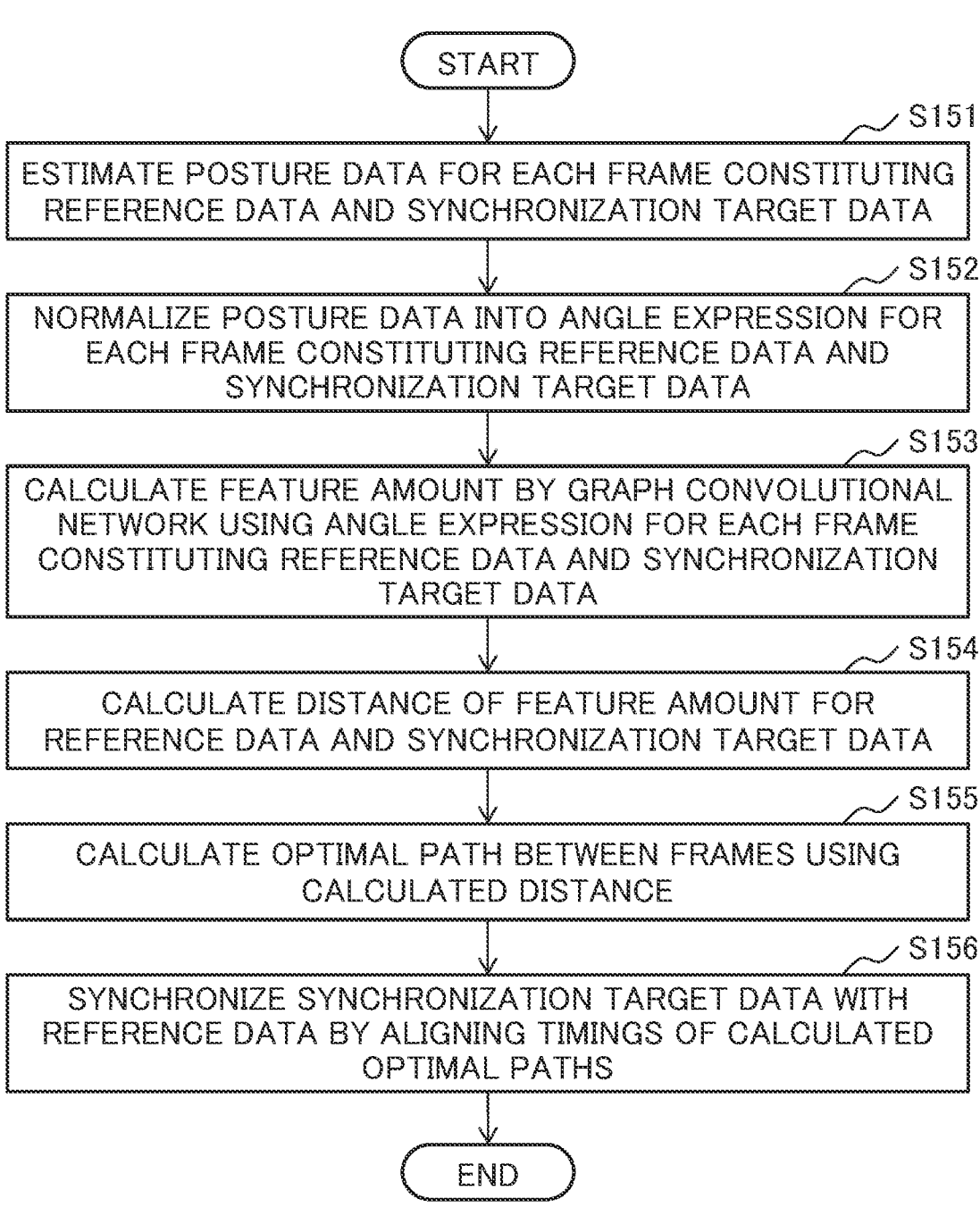
FIG. 14 is a flowchart for describing an example of a synchronization process by the motion data generation device according to the present disclosure.

Next, an example of a synchronization process (step S145 in FIG. 13) by the motion data generation device 10 will be described with reference to the drawings. FIG. 14 is a flowchart for describing a synchronization process. In the description along the flowchart of FIG. 14, the data conversion unit 16 included in the motion data generation device 10 will be described as an operation subject.

In FIG. 14, first, the data conversion unit 16 estimates posture data for each frame constituting the reference data and the synchronization target data (step S151).

Next, the data conversion unit 16 normalizes the posture data to an angle expression for each frame constituting the reference data and the synchronization target data (step S152).

Next, the data conversion unit 16 calculates the feature amount by the graph convolutional network using the angle expression for each frame constituting the synchronization target data and the reference data (step S153).

Next, the data conversion unit 16 calculates the distance of the feature amount with respect to the synchronization target data and the reference data (step S154).

Next, the data conversion unit 16 calculates an optimal path between frames using the calculated distance (step S155).

Next, the data conversion unit 16 synchronizes the synchronization target data with the reference data by aligning the timings of the calculated optimal paths (step S156). After step S156, the process proceeds to step S146 in FIG. 13.

As described above, the motion data generation device according to the present example embodiment includes the acquisition unit, the conversion data choosing unit, the data conversion unit, and the output unit. The acquisition unit acquires a plurality of pieces of motion data to be data converted. The conversion data choosing unit groups the plurality of pieces of motion data for each motion class that is the target motion for data augmentation. The data conversion unit sets at least one of the motion data grouped for each motion class for the reference data. The data conversion unit sets at least one piece of motion data different from the reference data among the grouped motion data for the data to be converted. The data conversion unit generates extension motion data in which the data to be converted is synchronized with reference to the motion timing of the reference data. The output unit outputs the generated extension motion data.

The motion data generation device of the present example embodiment sets at least one piece of motion data different from the reference data for the data to be converted using at least one piece of motion data grouped for each motion class as the reference data. The motion data generation device according to the present example embodiment generates extension motion data in which the data to be converted is synchronized with reference to the motion timing of the reference data. Therefore, according to the present example embodiment, the motion data generation device of the present example embodiment can generate motion data augmented in the time axis direction.

In an aspect of the present example embodiment, the data conversion unit sets all the motion data grouped for each motion class for the reference data. The data conversion unit sets all the motion data different from the reference data among the grouped motion data for the data to be converted. The data conversion unit generates extension motion data in which all pieces of data to be converted set for the reference data are synchronized with each other with reference to the motion timings of all the pieces of reference data. In the present aspect, all the motion data is set for the reference data, and the other motion data is synchronized as the data to be converted in a brute-force manner. Therefore, according to the present aspect, even with a small amount of motion data, it is possible to generate a large amount of motion data augmented in the time axis direction.

In an aspect of the present example embodiment, the data conversion unit includes a feature amount calculation unit, a distance calculation unit, and a synchronization processing unit. The feature amount calculation unit includes an encoder including a graph convolutional network. The feature amount calculation unit normalizes posture data estimated for each frame constituting motion data including a target motion into an angle expression. The feature amount calculation unit inputs posture data normalized to the angle expression to the encoder and calculates a feature amount in the embedded space. The encoder convolves posture data normalized to the angle expression by graph convolution to output embedding in an embedded space as a feature amount. The distance calculation unit calculates a distance between a feature amount calculated for each frame constituting the reference data and a feature amount calculated for each frame constituting the synchronization target data. The distance calculation unit calculates a distance between a feature amount related to a frame constituting the reference data and a feature amount related to a frame constituting the synchronization target data in a brute-force manner. The synchronization processing unit calculates an optimal path for each frame based on the calculated distance, and synchronizes the synchronization target data with the reference data by aligning the timings of the frames connected by the optimal path.

The data conversion unit according to the present aspect synchronizes the synchronization target data with the reference data based on the feature of the posture data estimated for each frame constituting the motion data. Therefore, the synchronization target data is synchronized based on the target motion included in the reference data without being affected by the background. The data conversion unit of the present aspect synchronizes the synchronization target data with the reference data based on the feature of the posture data normalized to the angle expression. Therefore, the synchronization target data is synchronized with high accuracy with reference to the target motion included in the reference data. That is, according to the present example embodiment, the synchronization target motion included in each of the plurality of pieces of motion data can be synchronized with high accuracy without being affected by the background.

In general, it is difficult to synchronize the target motion included in each of the two pieces of motion data based on the image included in the frame constituting the motion data. In the present aspect, a frame constituting motion data is dropped into an embedded space. In the embedded space, the distance between the feature amounts can be calculated. In this aspect, the same actions are associated using distances in the embedded space. In the present aspect, synchronization is performed using the DTW method based on the feature amount extracted in units of frames. Therefore, according to the present aspect, the target motions included in the two pieces of motion data can be synchronized with high accuracy as compared with the case of performing synchronization by directly using the posture data converted into the angle expression.

In the method of the present aspect, the timing of the target motion included in the synchronization target data is synchronized with the timing of the target motion included in the reference data in the time axis direction. Therefore, the target motion included in the reference data and the target motion included in the synchronization target data are normalized in the time axis direction. Therefore, according to the present aspect, the motion data can be augmented even without an annotation such as a tag or metadata. According to the present aspect, it is possible to augment motion data including motions in which motion timings and speeds of various human motion data are aligned.

Second Example Embodiment

Next, a motion data generation device according to a second example embodiment will be described with reference to the drawings. The motion data generation device according to the present example embodiment generates extension motion data using the motion data chosen according to the index value representing the relationship between the motion data.

(Configuration)

FIG. 15 is a block diagram illustrating an example of a configuration of a motion data generation device 20 according to the present example embodiment. The motion data generation device 20 includes an acquisition unit 21, an index value calculation unit 22, a conversion data choosing unit 25, a data conversion unit 26, and an output unit 27.

The acquisition unit 21 (acquisition means) has the same configuration as the acquisition unit 11 of the first example embodiment. The acquisition unit 21 acquires a plurality of pieces of motion data 210 to be data converted. The motion data 210 is data similar to the motion data 110 of the first example embodiment. The motion data 210 is data indicating a motion of a person who performs a target motion for data augmentation. The motion data 210 is extracted from frames constituting moving image data including an image of a person who performs a target motion for data augmentation.

The index value calculation unit 22 (index value calculation means) extracts a preset number of samples from the plurality of pieces of motion data 210. For example, the index value calculation unit 22 randomly extracts a preset number of samples from the plurality of pieces of motion data 210. The index value calculation unit 22 may extract samples from the plurality of pieces of motion data 210 based on a preset rule.

The index value calculation unit 22 calculates an index value representing a relationship between samples with respect to the extracted motion data 210. For example, the index value calculation unit 22 calculates a degree of similarity between samples as an index value representing a relationship between samples. For example, the index value calculation unit 22 calculates a degree of similarity such as a degree of cosine similarity.

For example, the index value calculation unit 22 calculates a degree of similarity Ds using the following Formula 1.

[Math. 1]

$$D_s = \frac{\sum_{i=1}^{n} A_i B_i}{\sqrt{\sum_{i=1}^{n} A_i^2} \sqrt{\sum_{i=1}^{n} B_i^2}} \qquad (1)$$

The above Formula 1 is an example of a formula for calculating a degree of cosine similarity between the motion data A and the motion data B. The index value calculation unit 22 may calculate the degree of similarity between the motion data A and the motion data B by a calculation method different from the above Formula 1.

For example, the index value calculation unit 22 may calculate a distance between samples as an index value representing a relationship between samples. For example, the index value calculation unit 22 calculates a Euclidean distance.

The conversion data choosing unit 25 (conversion data choosing means) pairs the motion data 210 to be converted according to the calculated index value. For example, the conversion data choosing unit 25 pairs the motion data 210 to be converted according to the degree of similarity between the samples. As the degree of similarity between the samples is smaller, the motion timings of the two pieces of motion data 210 deviate. Therefore, when a pair of motion data 210 having a small degree of similarity between samples is synchronized, synchronous data in which the motion timings are aligned in the time axis direction can be generated. For example, the conversion data choosing unit 25 chooses a predetermined number of combinations of the motion data 210 in ascending order of a degree of similarity. For example, the conversion data choosing unit 25 chooses a combination of the motion data 210 having a degree of similarity below a preset similarity degree threshold value.

The conversion data choosing unit 25 may pair the motion data 210 to be converted according to the distance between samples. As the distance between the samples increases, the motion timings of the two pieces of motion data 210 deviate from each other. Therefore, when a pair of motion data 210 having a large distance between samples is synchronized, synchronous data in which the motion timings are aligned in the time axis direction can be generated. For example, the conversion data choosing unit 25 chooses a predetermined number of combinations of the motion data 210 in descending order of distance. For example, the conversion data choosing unit 25 chooses a combination of the motion data 210 with a distance exceeding a preset distance threshold value.

FIG. 16 is a conceptual diagram for describing pairing of the motion data 210 by the conversion data choosing unit 25. One cell in the drawing indicates one piece of motion data 210. In the example of FIG. 16, motion data 210 having a data ID of 1 to 3 is extracted. FIG. 16 illustrates a degree of similarity between some pairs of motion data 210 to which a data identifier (ID) is assigned. The number of the cell having the same combination of data IDs is the degree of similarity (1.0) of the same actually measured motion data 210. In FIG. 16, the maximum value of the degree of similarity is 1.0. In the example of FIG. 16, it is assumed that a predetermined similarity degree threshold value (similarity degree threshold value) is set to 0.8. In the case of the example of FIG. 16, the conversion data choosing unit 25 chooses a pair with a degree of similarity below the threshold value (0.8). Specifically, the conversion data choosing unit 25 chooses a pair of motion data whose data IDs are 1 and 3 and a pair of motion data whose data IDs are 2 and 3.

The data conversion unit 26 (data conversion means) has the same configuration as the data conversion unit 16 of the first example embodiment. The data conversion unit 26 acquires the motion data 210 paired according to the index value representing the relationship between the samples from the conversion data choosing unit 25. The data conversion unit 26 sets one of the paired motion data 210 for the reference data. The data conversion unit 26 sets the motion data 210 different from the reference data among the paired motion data 210 for the data to be converted. The data conversion unit 26 synchronizes the data to be converted with reference to the motion timing of the reference data.

When synchronizing the data to be converted with the reference data, the data conversion unit 26 sets motion data 210 different from the reference data as new reference data. The data conversion unit 26 sets the motion data 210 initially set for the reference data among the paired motion data 210 for the data to be converted. The data conversion unit 26 synchronizes the data to be converted with reference to the motion timing of the new reference data.

The data conversion unit 26 synchronizes all pairs of motion data 210 paired according to an index value representing a relationship between samples.

The output unit 27 (output means) has the same configuration as the output unit 17 of the first example embodiment. The output unit 27 outputs the motion data (extension motion data 270) synchronized by the data conversion unit 26. The extension motion data 270 is used for training on the target motion. The extension motion data 270 is generated according to the number of pairs of the motion data 210 chosen according to the index value representing the relationship between the samples. That is, the motion data generation device 20 generates the extension motion data 270 using the pair of motion data 210 chosen according to the index value representing the relationship between the samples, thereby efficiently augmenting the motion data related to the target motion.

(Operation)

Figure 17:
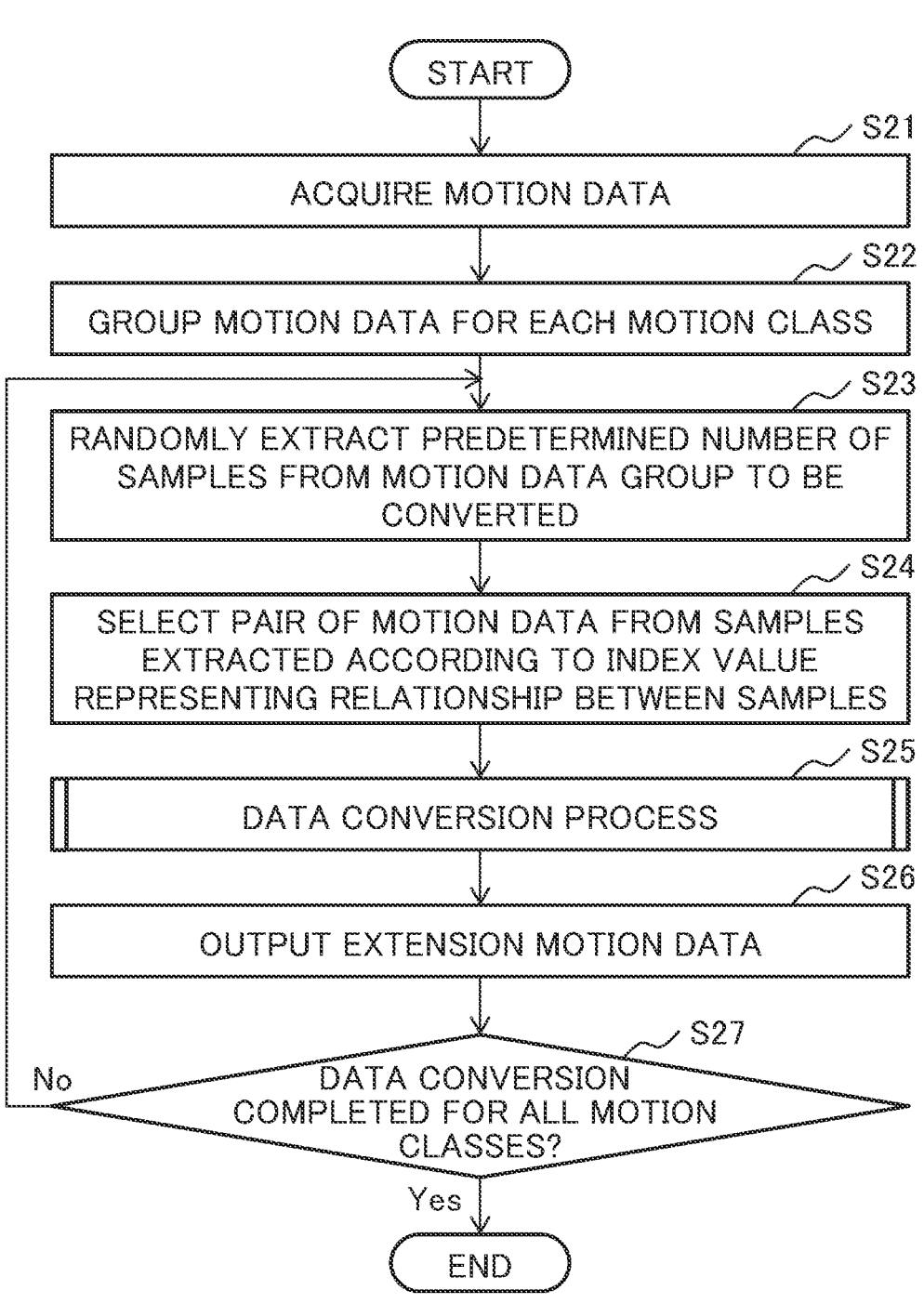
FIG. 17 is a flowchart for describing an example of the operation of the motion data generation device according to the present disclosure.

Next, the operation of the motion data generation device 20 will be described with reference to the drawings. FIG. 17 is a flowchart for describing an example of the operation of the motion data generation device 20. In the description along the flowchart of FIG. 17, the motion data generation device 20 will be described as an operation subject.

In FIG. 17, first, the motion data generation device 20 acquires the motion data 210 to be converted (step S21).

Next, the motion data generation device 20 groups the motion data 210 for each motion class (step S22).

Next, the motion data generation device 20 randomly extracts a predetermined number of samples from the motion data group to be converted (step S23). The motion data generation device 20 may extract a predetermined number of samples from the motion data group to be converted based on a preset reference.

The motion data generation device 20 chooses a pair of motion data 210 from the extracted samples according to the index value representing the relationship between the samples (step S24). For example, the motion data generation device 20 uses the degree of similarity and the distance as the index value representing the relationship between the samples.

Next, the motion data generation device 20 executes a data conversion process (step S25). In the data conversion process of step S25, the motion data generation device 20 synchronizes the synchronization target data with the reference data using the posture data normalized to the angle expression. The motion data generation device 20 synchronizes all the extracted pairs of motion data. Details of the data conversion process in step S25 will be described later.

Next, the motion data generation device 20 outputs the extension motion data 270 synchronized by the synchronization process (step S26). For example, the output extension motion data 270 is used for training on the target motion. For example, the motion data generation device 20 may display the extension motion data 270 on the screen.

When the data conversion is not completed for all the motion classes (No in step S27), the process returns to step S23. The motion data generation device 20 continues the data conversion process for the motion class for which the data conversion is not completed. When the data conversion is completed for all the motion classes (Yes in step S27), the process according to the flowchart in FIG. 17 is ended. The motion data generation device 20 may be configured to output the extension motion data 270 after the data conversion regarding all the motion classes is completed.

[Data Conversion Process]

Figure 18:
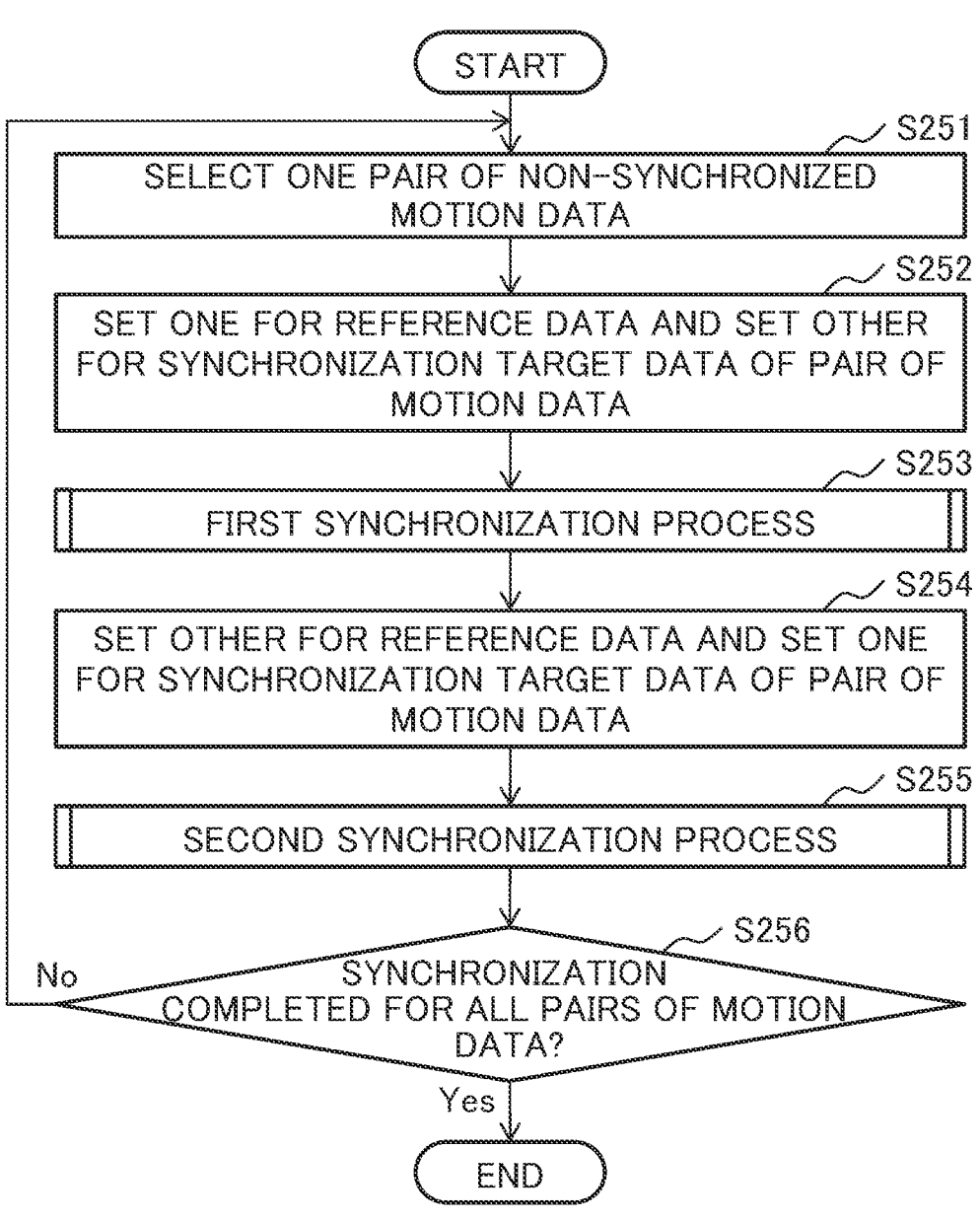
FIG. 18 is a flowchart for describing an example of a data conversion process by the motion data generation device according to the present disclosure.

Next, the data conversion process (step S25 in the flowchart of FIG. 17) by the motion data generation device 20 will be described with reference to the drawings. FIG. 18 is a flowchart for describing an example of the data conversion process by the motion data generation device 20. In the example of the flowchart of FIG. 18, a pair of motion data 210 chosen according to an index value representing a relationship between samples is synchronized. In the description along the flowchart of FIG. 18, the data conversion unit 26 included in the motion data generation device 20 will be described as an operation subject.

In FIG. 18, first, the data conversion unit 26 selects one pair of unsynchronized motion data 210 (step S251).

Next, the data conversion unit 26 sets one for the reference data and sets the other for the synchronization target data of the pair of selected motion data 210 (step S252).

Next, the data conversion unit 26 executes a first synchronization process (step S253). The first synchronization process is similar to the synchronization process (FIG. 14) in the first example embodiment. In the first synchronization process, the data conversion unit 26 synchronizes the synchronization target data that is the other motion data 210 with the reference data, that is one motion data 210 of the pair of motion data 210. In step S253, one piece of extension motion data 270 in which the other of the motion data 210 is synchronized with the one is generated.

Next, the data conversion unit 26 sets the other for the reference data and sets the one for the synchronization target data of the selected pair of motion data 210 (step S254). Step S254 is a process of exchanging the reference data and the synchronization target data of the pair of motion data 210.

Next, the data conversion unit 26 executes a second synchronization process (step S255). The second synchronization process is similar to the synchronization process (FIG. 14) in the first example embodiment. In the second synchronization process, the data conversion unit 26 synchronizes the synchronization target data that is one of the motion data 210 with the reference data that is the other of the motion data 210 of the pair of motion data 210. In step S253, one piece of extension motion data 270 in which one of the motion data 210 is synchronized with the other is generated. That is, at the stage of step S255, two pieces of extension motion data 270 in which pair of the motion data 210 is synchronized with each other are generated.

When the synchronization is not completed for all the pairs of the motion data 210 (No in step S256), the process returns to step S251. When the synchronization is completed for all the pairs of the motion data 210 (Yes in step S256), the process proceeds to step S26 of the flowchart of FIG. 17. At this stage, extension motion data synchronized with each other is generated for all the chosen pairs of motion data.

As described above, the motion data generation device according to the present example embodiment includes the acquisition unit, the index value calculation unit, the conversion data choosing unit, the data conversion unit, and the output unit. The acquisition unit acquires a plurality of pieces of motion data to be data converted. The index value calculation unit extracts a preset number of samples from the plurality of pieces of motion data. The index value calculation unit calculates an index value representing a relationship between samples with respect to the extracted samples. The conversion data choosing unit groups the plurality of pieces of motion data for each motion class that is the target motion for data augmentation. The conversion data choosing unit pairs the motion data to be converted according to the index value calculated by the index value calculation unit. The data conversion unit generates extension motion data in which the paired motion data is synchronized with each other. The output unit outputs the generated extension motion data.

The motion data generation device according to the present example embodiment extracts a preset number of samples from the plurality of pieces of motion data. The motion data generation device according to the present example embodiment generates extension motion data in which the motion data paired according to the index value is synchronized with each other. Therefore, according to the present example embodiment, it is possible to efficiently generate the necessary number of pieces of motion data augmented in the time axis direction by using the preset number of pieces of motion data.

In an aspect of the present example embodiment, the index value calculation unit calculates a degree of similarity between samples as the index value. The conversion data choosing unit pairs two pieces of motion data having a degree of similarity smaller than a preset similarity degree threshold value. According to the present aspect, two pieces of motion data that have a small degree of similarity and a large difference in motion timing are synchronized with each other, so that extension motion data having the aligned motion timing can be generated.

In an aspect of the present example embodiment, the index value calculation unit calculates a distance between samples as the index value. The conversion data choosing unit pairs two pieces of motion data having a distance larger than a preset distance threshold value. According to the present aspect, two pieces of motion data having a large distance and a large difference in motion timing are synchronized with each other, so that extension motion data having the aligned motion timing can be generated.

Third Example Embodiment

Next, a motion data generation device according to a third example embodiment will be described with reference to the drawings. The motion data generation device according to the present example embodiment generates extension motion data by synchronizing motion data between clusters selected from clusters classified by clustering.
(Configuration)

FIG. 19 is a block diagram illustrating an example of a configuration of a motion data generation device 30 according to the present example embodiment. The motion data generation device 30 includes an acquisition unit 31, a clustering unit 32, a pair selection unit 33, a conversion data choosing unit 35, a data conversion unit 36, and an output unit 37.

The acquisition unit 31 (acquisition means) has the same configuration as the acquisition unit 11 of the first example embodiment. The acquisition unit 31 acquires a plurality of pieces of motion data 310 to be data converted. The motion data 310 is data similar to the motion data 110 of the first example embodiment. The motion data 310 is data indicating a motion of a person who performs a target motion for data augmentation. The motion data 310 is extracted from frames constituting moving image data including an image of a person who performs a target motion for data augmentation.

The clustering unit 32 (clustering means) groups the plurality of pieces of motion data 310 into a plurality of sets (clusters) by a predetermined clustering method. For example, the clustering unit 32 classifies the plurality of pieces of motion data 310 into k clusters by a non-hierarchical clustering method such as a k-means method (k is a natural number). The clustering unit 32 may be configured to group the plurality of pieces of motion data 310 using a method other than the k-means method. For example, the clustering unit 32 may be configured to group the plurality of motion data 310 by using a hierarchical clustering method such as a group average method, a Ward method, a shortest distance method, or a longest distance method.

Figure 20:
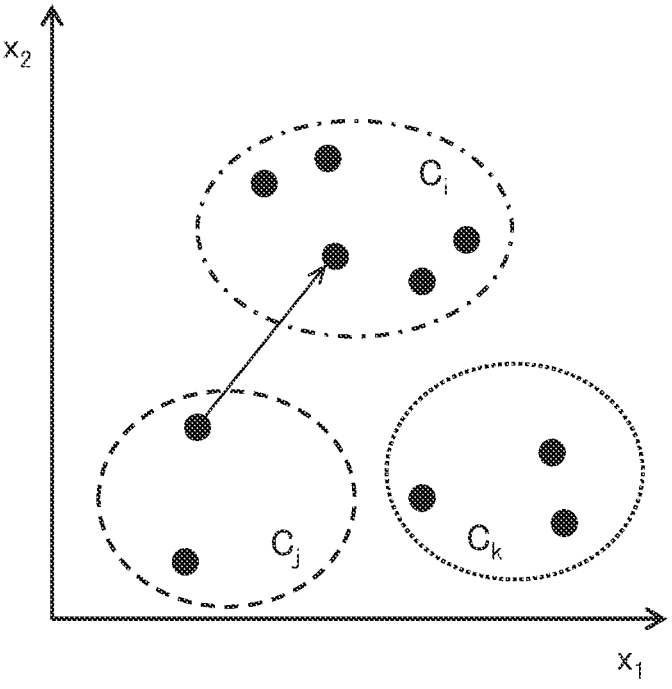
FIG. 20 is a conceptual diagram for describing a data choosing method by the motion data generation device according to the present disclosure.

FIG. 20 is a conceptual diagram for describing the motion data 310 (black circles) grouped into k clusters by the clustering unit 32. FIG. 20 illustrates an example in which motion data (black circle) is mapped onto a two-dimensional orthogonal coordinate system defined by a horizontal axis ($x_1$) and a vertical axis ($x_2$). FIG. 20 illustrates a cluster $C_i$ (within the range of the broken line), a cluster $C_j$ (within the range of the one-dot chain line), and a cluster $C_k$ (within the range of the dotted line) among the k clusters (i, j, and k are natural numbers).

The pair selection unit 33 (pair selection means) pairs two clusters included in a plurality of clusters grouped according to the number of pieces of motion data 310 included in the cluster. The pair selection unit 33 pairs a cluster having a small number of pieces of motion data 310 with another cluster. For example, the pair selection unit 33 pairs a cluster having the smallest number of pieces of motion data 310 with another cluster. The motion data 310 included in a cluster having a small number of pieces of motion data 310 tends to have a larger difference in motion timing than the motion data 310 included in another cluster. Therefore, the pair selection unit 33 intensively selects the motion data 310 included in the cluster with a small number of samples, and makes it easy to generate the extension motion data with a small difference in synchronization timing.

For example, the pair selection unit 33 pairs two clusters by a probabilistic method. For example, the pair selection unit 33 calculates the inverse ratio from the ratio of the number of pieces of motion data 310 included in the cluster. The motion data 310 included in a cluster having a small number of samples has a large deviation from the motion data 310 included in other clusters. Therefore, the pair selection unit 33 calculates the inverse ratio in such a way that a cluster with a small number of samples can be easily selected, and brings the cluster into a state of being easily selected.

In the case of the example of FIG. 20, the ratio of the number of samples of the motion data 310 included in the cluster $C_i$, the cluster $C_j$, and the cluster $C_k$ is 5:2:3. In this case, the inverse ratio regarding the ratio of the number of samples of the motion data 310 included in the cluster $C_i$, the cluster $C_j$, and the cluster $C_k$ is 6:15:10. The pair selection unit 33 selects the cluster $C_j$ having a large inverse ratio. The cluster $C_j$ has a smaller number of pieces of motion data 310 than other clusters. The pair selection unit 33 selects a cluster different from the cluster $C_j$. In the example of FIG. 20, the cluster $C_i$ is selected. The pair selection unit 33 sets the motion data 310 included in the selected cluster $C_j$ and the selected cluster $C_i$ as conversion targets.

The conversion data choosing unit 35 (conversion data choosing means) randomly extracts the motion data 310 to be a sample from each of the paired two clusters. The conversion data choosing unit 35 pairs the extracted motion data 310. The conversion data choosing unit 35 pairs the motion data 310 until the target value of the extension motion data 370 is satisfied. The target value of the extension motion data 370 is set to any value. The conversion data choosing unit 35 outputs the paired motion data 310 to the data conversion unit 36.

The data conversion unit 36 (data conversion means) has the same configuration as the data conversion unit 16 of the first example embodiment. The data conversion unit 36 acquires the motion data 310 paired by the conversion data choosing unit 35 from the conversion data choosing unit 35. The data conversion unit 36 sets one of the paired motion data 310 for the reference data. The data conversion unit 36 sets the motion data 310 different from the reference data among the paired motion data 310 for the data to be converted. The data conversion unit 36 synchronizes the data to be converted with reference to the motion timing of the reference data.

When synchronizing the data to be converted with the reference data, the data conversion unit 36 sets motion data 310 different from the reference data as new reference data. The data conversion unit 36 sets the motion data 310 initially set for the reference data among the paired motion data 310 for the data to be converted. The data conversion unit 36 synchronizes the data to be converted with reference to the motion timing of the new reference data.

The data conversion unit 36 synchronizes all pairs of the motion data 310 paired by the conversion data choosing unit 35.

The output unit 37 (output means) has the same configuration as the output unit 17 of the first example embodiment. The output unit 37 outputs the motion data (extension motion data 370) synchronized by the data conversion unit 36. The extension motion data 370 is used for training on the target motion. The extension motion data 370 is generated according to the number of pairs of the motion data 310 chosen by the conversion data choosing unit 35. That is, the motion data generation device 30 generates the extension motion data 370 using the pair of motion data 310 chosen by the conversion data choosing unit 35, thereby efficiently augmenting the motion data related to the target motion.

(Operation)

Figure 21:
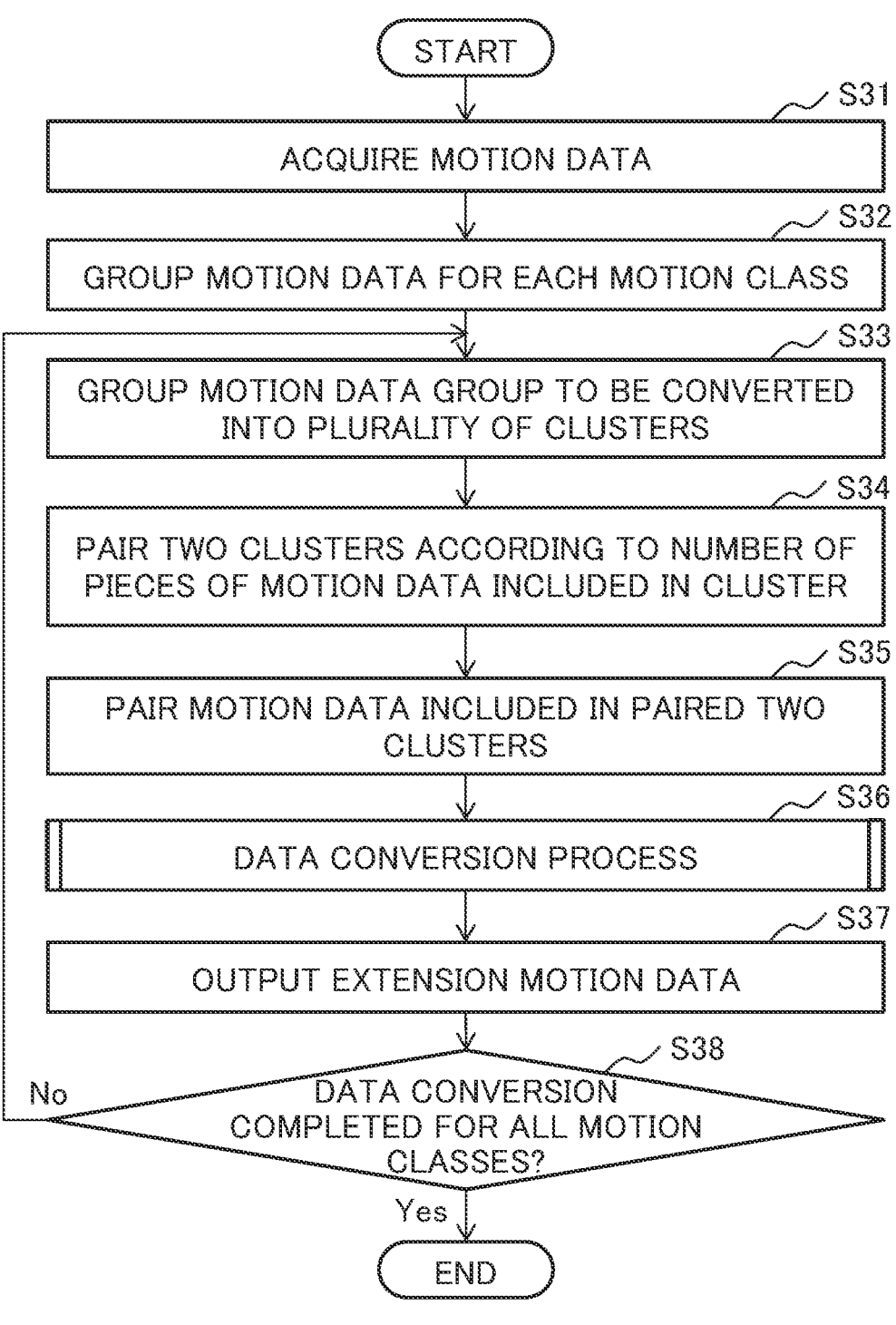
FIG. 21 is a flowchart for describing an example of the operation of the motion data generation device according to the present disclosure.

Next, the operation of the motion data generation device 30 will be described with reference to the drawings. FIG. 21 is a flowchart for describing an example of the operation of the motion data generation device 30. In the description along the flowchart of FIG. 21, the motion data generation device 30 will be described as an operation subject.

In FIG. 21, first, the motion data generation device 30 acquires the motion data 310 to be converted (step S31).

Next, the motion data generation device 30 groups the motion data 310 for each motion class (step S32).

Next, the motion data generation device 30 groups the motion data group to be converted into a plurality of clusters by clustering (step S33). For example, the motion data generation device 30 groups the motion data group to be converted into a plurality of clusters by a method such as a k-means method.

Next, the motion data generation device 30 pairs the two clusters according to the number of pieces of motion data 310 included in the cluster (step S34). For example, the motion data generation device 30 selects a cluster having a small number of pieces of motion data 310 using a probabilistic method. The motion data generation device 30 pairs the selected cluster with another cluster.

Next, the motion data generation device 30 pairs the motion data 310 included in the paired two clusters (step S35). For example, the motion data generation device 20 randomly extracts the motion data 310 from each of the two paired clusters, and pairs the two extracted motion data 310.

Next, the motion data generation device 30 executes a data conversion process (step S36). In the data conversion process of step S36, the motion data generation device 30 synchronizes the synchronization target data with the reference data using the posture data normalized to the angle expression. The motion data generation device 30 synchronizes all the extracted pairs of motion data. Details of the data conversion process in step S36 will be described later.

Next, the motion data generation device 30 outputs the extension motion data 370 synchronized by the synchronization process (step S37). For example, the output extension motion data 370 is used for training on the target motion. For example, the motion data generation device 30 may display the extension motion data 370 on the screen.

When the data conversion is not completed for all the motion classes (No in step S38), the process returns to step S33. The motion data generation device 30 continues the data conversion process for the motion class for which the data conversion is not completed. When the data conversion is completed for all the motion classes (Yes in step S38), the process according to the flowchart in FIG. 21 is ended. The motion data generation device 30 may be configured to output the extension motion data 370 after the data conversion regarding all the motion classes is completed.

[Data Conversion Process]

Figure 22:
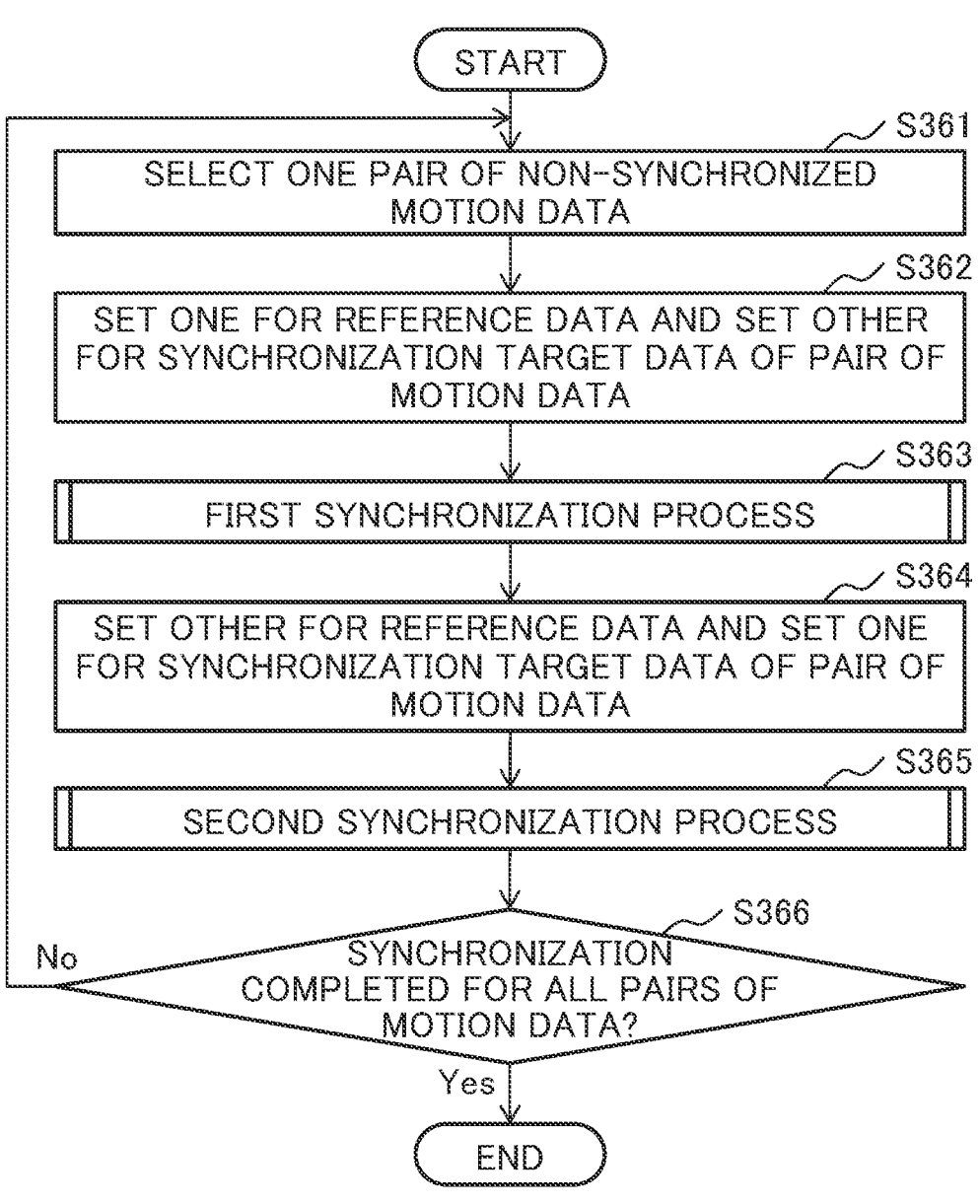
FIG. 22 is a flowchart for describing an example of a data conversion process by the motion data generation device according to the present disclosure.

Next, the data conversion process (step S36 in the flowchart of FIG. 21) by the motion data generation device 30 will be described with reference to the drawings. FIG. 22 is a flowchart for describing an example of the data conversion process by the motion data generation device 30. In the example of the flowchart of FIG. 22, a pair of motion data 310 chosen from each of two clusters paired according to the number of motion data 310 are synchronized. In the description along the flowchart of FIG. 22, the data conversion unit 36 included in the motion data generation device 30 will be described as an operation subject.

In FIG. 22, first, the data conversion unit 36 selects one pair of unsynchronized motion data 310 (step S361).

Next, the data conversion unit 36 sets one for the reference data and sets the other for the synchronization target data of the selected pair of motion data 310 (step S362).

Next, the data conversion unit 36 executes a first synchronization process (step S363). The first synchronization process is similar to the synchronization process (FIG. 14) in the first example embodiment. In the first synchronization process, the data conversion unit 36 synchronizes the synchronization target data that is the other of the motion data 310 with the reference data, that is one of the motion data 310 of the pair of motion data 310. In step S363, one piece of extension motion data 370 in which the other of the motion data 310 is synchronized with the one is generated.

Next, the data conversion unit 36 sets the other for the reference data and sets one for the synchronization target data of the selected pair of motion data 310 (step S364). Step S364 is a process of exchanging the reference data and the synchronization target data of the pair of motion data 310.

Next, the data conversion unit 36 executes a second synchronization process (step S365). The second synchronization process is similar to the synchronization process (FIG. 14) in the first example embodiment. In the second synchronization process, the data conversion unit 36 synchronizes the synchronization target data that is the one of the motion data 310 with the reference data that is the other of the motion data 310 of the pair of motion data 310. In step S363, one piece of extension motion data 370 in which one of the motion data 310 is synchronized with the other is generated. That is, at the stage of step S365, two pieces of extension motion data 370 in which pairs of the motion data 310 is synchronized with each other are generated.

When the synchronization is not completed for all the pairs of the motion data 310 (No in step S366), the process returns to step S361. When the synchronization is completed for all the pairs of the motion data 310 (Yes in step S366), the process proceeds to step S36 of the flowchart of FIG. 22. At this stage, extension motion data synchronized with each other is generated for all the chosen pairs of motion data.

As described above, the motion data generation device according to the present example embodiment includes the acquisition unit, the clustering unit, the pair selection unit, the conversion data choosing unit, the data conversion unit, and the output unit. The acquisition unit acquires a plurality of pieces of motion data to be data converted. The clustering unit groups the plurality of pieces of motion data into a plurality of clusters by a predetermined clustering method. The pair selection unit pairs two clusters included in a plurality of clusters grouped according to the number of pieces of motion data included in the cluster. The conversion data choosing unit randomly extracts at least one piece of motion data from each of the paired two clusters. The conversion data choosing unit pairs the motion data extracted from each of the two clusters. The data conversion unit generates extension motion data in which the paired motion data is synchronized with each other. The output unit outputs the generated extension motion data.

The motion data generation device according to the present example embodiment pairs two clusters included in a plurality of clusters grouped according to the number of pieces of motion data included in the cluster. The motion data generation device according to the present example embodiment randomly extracts at least one piece of motion data from each of the paired two clusters, and pairs the extracted motion data. The motion data generation device according to the present example embodiment generates extension motion data in which the paired motion data is synchronized with each other. Therefore, according to the present example embodiment, a cluster having a small number of samples is intensively chosen as a synchronization target, so that it is possible to efficiently generate motion data augmented in the time axis direction.

In an aspect of the present example embodiment, the pair selection unit calculates the inverse ratio from the ratio of the number of pieces of motion data included in the plurality of clusters. The pair selection unit pairs a cluster having a maximum calculated inverse ratio value with any cluster having a non-maximum inverse ratio value. According to the present aspect, a cluster having a small number of samples is stochastically selected according to the calculated inverse ratio value. Therefore, according to the present aspect, by stochastically choosing a cluster with a small number of samples, it is possible to efficiently generate motion data augmented in the time axis direction.

Fourth Example Embodiment

Next, a training device according to the fourth example embodiment will be described with reference to the drawings. The training device according to the present example embodiment trains an encoder that synchronizes motion data extracted from different moving image data (motion data). The moving image data includes a plurality of frames. Data regarding the posture of the person extracted from each frame is referred to as posture data. Data in which a plurality of pieces of posture data is connected in time series is referred to as motion data. In the following description, synchronizing the same operations included in different moving image data may be expressed as synchronizing different moving image data. The encoder trained by the training device of the present example embodiment is used by the motion data generation devices according to the first to third example embodiments.

The present example embodiment includes portions described based on the method disclosed in NPL 1 (NPL 1: D. Dwibedi, et al., "Temporal Cycle-Consistency Learning", IEEE Conf. on Computer Vision and Pattern Recognition (2019)).

(Configuration)

Figure 23:
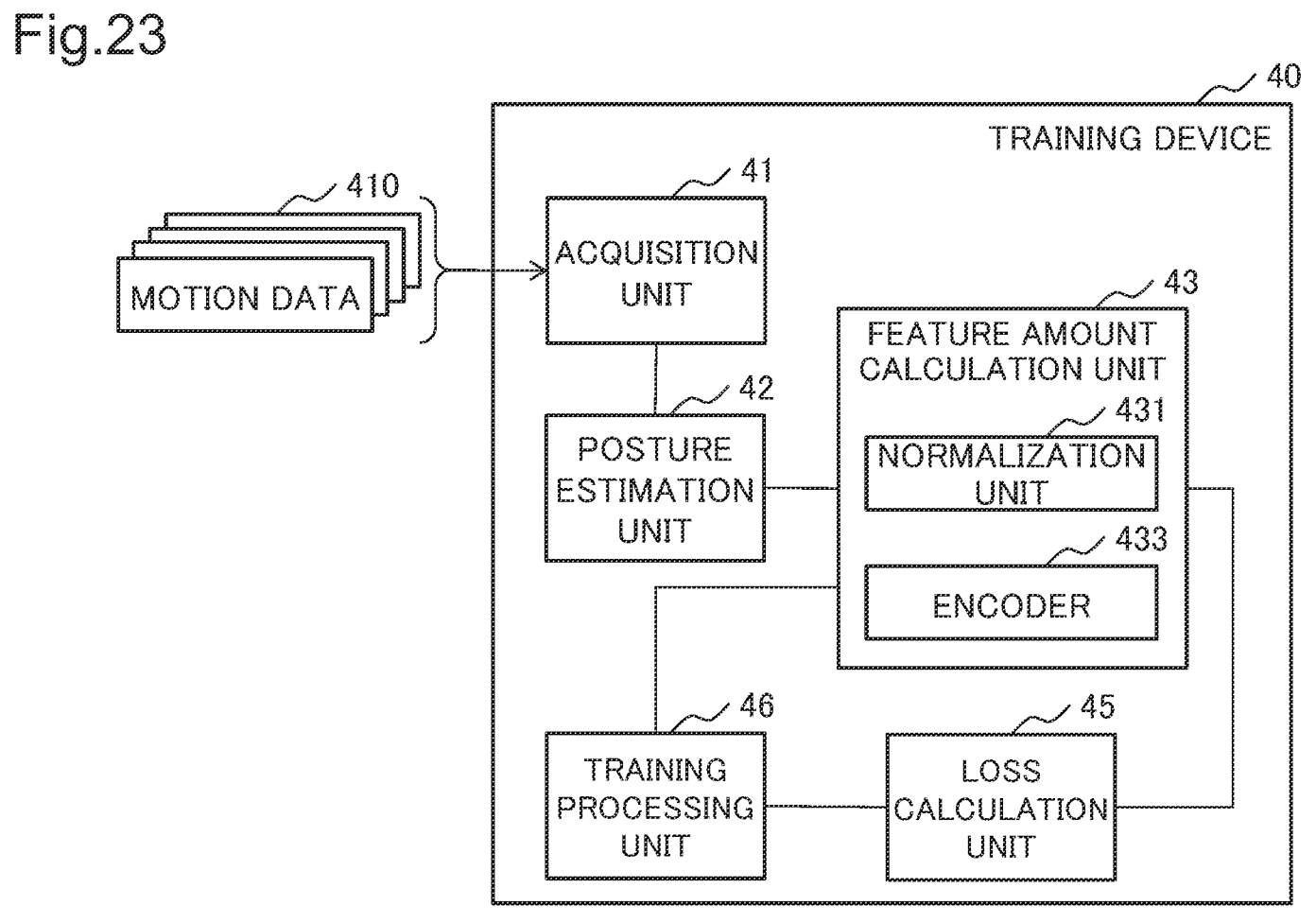

FIG. 23 is a block diagram illustrating an example of a configuration of a training device 40 according to the present example embodiment. The training device 40 includes an acquisition unit 41, a posture estimation unit 42, a feature amount calculation unit 43, a loss calculation unit 45, and a training processing unit 46.

The acquisition unit 41 (acquisition means) acquires motion data 410. The motion data 410 is data including an image of a person who performs the training target motion. For example, the training target motion includes motions such as backlash, jumping, walking, running, and stretching. The type of the training target motion is not particularly limited as long as it can be extracted from the frame constituting the moving image data.

For example, the acquisition unit 41 may acquire posture data of a person extracted from the moving image data. The posture data is a data set of position coordinates regarding the position of a representative site of a person. For example, a representative site of the person is a joint, an end, or the like. For example, the acquisition unit 41 may acquire posture data measured using motion capture. When the acquisition unit 41 directly acquires posture data, the posture estimation unit 42 can be omitted.

The posture estimation unit 42 (estimation means) extracts a person from a frame included in the motion data 410. The posture estimation unit 42 estimates posture data of the extracted person. For example, the posture estimation unit 42 estimates posture data of the person extracted from the motion data 410 using the deep learning model. The posture estimation unit 42 estimates a spatial position of a representative site of the person extracted from the motion data 410 as posture data. In other words, the posture data is data regarding the posture of the person extracted from the motion data 410.

The feature amount calculation unit 43 (feature amount calculation means) includes a normalization unit 431 and an encoder 433. The feature amount calculation unit 43 normalizes posture data into an angle expression using the normalization unit 431. The feature amount calculation unit 43 extracts a feature amount regarding the training target motion from posture data normalized to the angle expression using the encoder 433.

The normalization unit 431 (normalization means) normalizes the posture data into an angle expression. The posture data includes attributes related to a physique such as lengths of arms and legs of a person who is a source from which the posture data is acquired. On the other hand, the posture data normalized to the angle expression does not include the attribute related to the physique of the person who is the source from which the posture data is acquired. The normalization unit 431 normalizes posture data into an angle expression by calculating an angle formed by connection lines connecting joints of a person for each joint.

The encoder 433 includes a graph convolutional network (GCN). The encoder 433 is trained on a unique embedded expression with respect to a frame included in the motion data 410. For example, the encoder 433 performs feature extraction by training using the temporal cycle consistency (TCC) method disclosed in NPL 1. The TCC training is self-supervised training. According to the TCC training, when there is a plurality of pieces of motion data 410 including the same motion, the feature extractor can be trained without a label by calculating a loss function (cycle-back loss) looking for a relevant relationship therebetween.

The joint angle data set calculated by the normalization unit 431 is input to the encoder 433. The encoder 433 calculates a feature amount by the graph convolutional network with respect to the input joint angle data set. The encoder 433 converts a joint angle data set represented by a coordinate system of a three-dimensional space into an embedded expression. In this manner, the encoder 433 regards an adjacent joint expressed in a skeleton format as a graph structure and performs graph convolution. The encoder 433 uses a graph convolutional network for a joint angle data set in a skeleton format that does not include the background of the motion data 410. Therefore, the feature amount extracted using the encoder 433 does not include the influence of the background of the motion data 410.

For example, the encoder 433 may be configured to output the feature amount according to an input of a context in which a plurality of adjacent frames is combined. In this case, the encoder 433 uses Spatio-Temporal (ST)-GCN. For example, for 5 consecutive frames with frame number 1 to 5, the frames with frame number 1 to 3 are combined and selected as the context, the frames with frame number 2 to 4 are combined and selected as the context, and the frames with frame number 3 to 5 are combined and selected as the context. In this way, it is preferable that the contexts that are consecutive to each other share frames of the same frame number.

The loss calculation unit 45 (loss calculation means) calculates a loss using the feature amount calculated by the encoder 433. For example, the loss calculation unit 45 calculates the loss using the Cycle-back Loss method disclosed in NPL 1. A method of calculating loss by the loss calculation unit 45 is not limited.

In the case of using the method of NPL 1, the loss calculation unit 45 applies an encoder model based on Residual Network (ResNet) to two pieces of motion data 410 (image sequences) including the same operation. As a result, the data string (embedded data string) of the embedded expression is obtained. For example, the loss calculation unit 45 obtains an embedded data string using an encoder model based on the ResNet 50 including 50 layers of the convolutional neural network (CNN). For example, the loss calculation unit 45 applies an encoder model based on the ResNet 50 to two pieces of motion data 410 (reference data and synchronization target data) to obtain an embedded data string. The loss calculation unit 45 searches for the nearest embedding v among the embeddings included in the embedded data string V of the synchronization target data for the embedding $u_i$ in the i-th frame of the embedded data string U of the reference data (i is a natural number). The loss calculation unit 45 searches for the nearest embedding $u_k$ in the embedded data string U of the reference data for the searched embedding v (k is a natural number). The loss calculation unit 45 calculates the loss using the embedding $u_i$ and the embedding $u_k$. For example, the loss calculation unit 45 calculates a cross entropy loss regarding matching between i and k as a loss. For example, the loss calculation unit 45 calculates a regression loss regarding the difference between i and k as a loss.

The training processing unit 46 (training processing means) calculates a change amount (gradient) of the calculated loss. For example, the training processing unit 46 calculates the gradient using the gradient descent method. The training processing unit 46 trains the encoder 433 by machine training according to the calculated gradient. The training processing unit 46 trains the encoder 433 until the gradient is smaller than a preset reference. For example, the training processing unit 46 trains the encoder 433 using stochastic gradient descent (SGD). The training processing unit 46 may train the encoder 433 using a method other than the stochastic gradient descent SGD.

(Operation)

Figure 24:
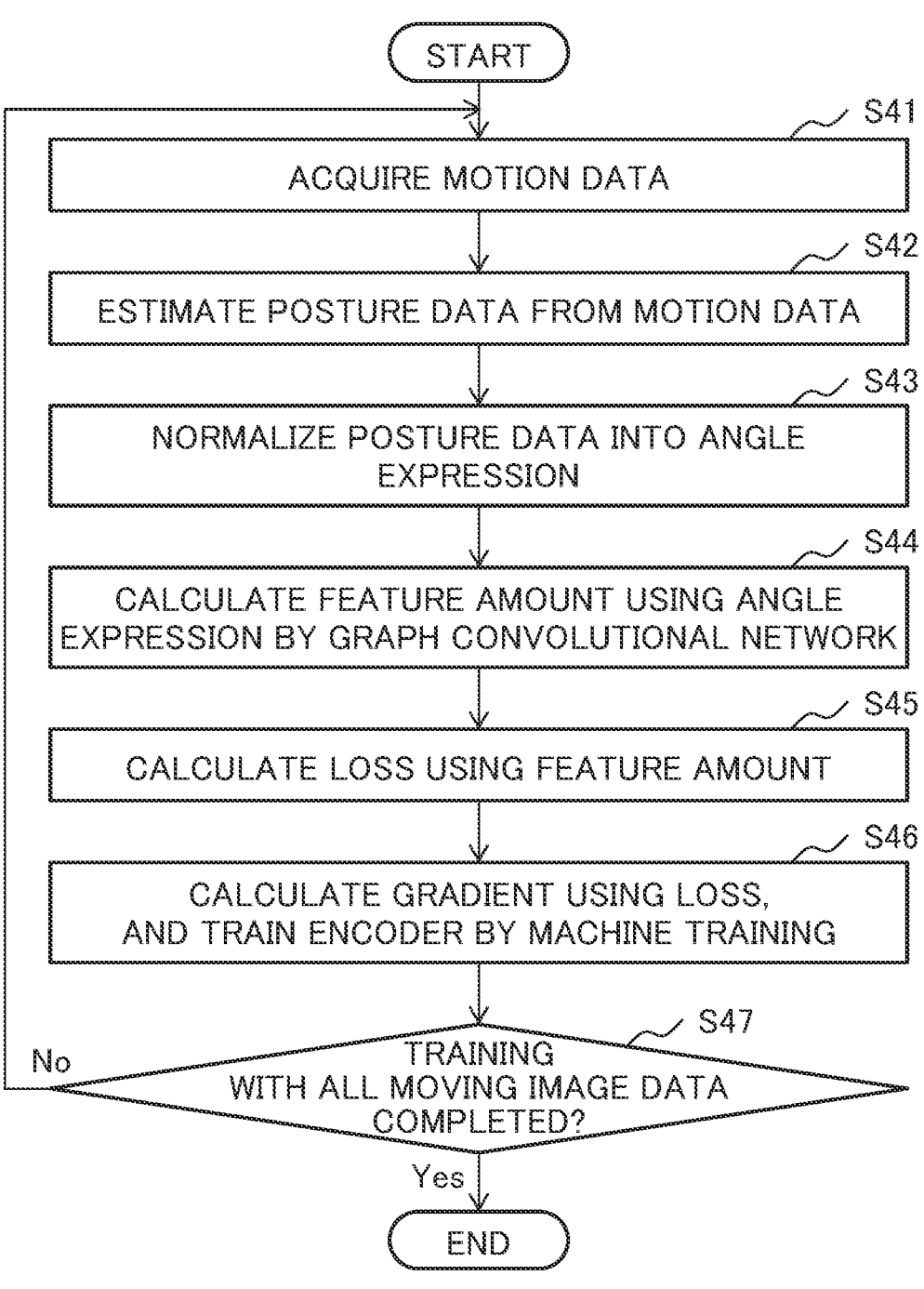
FIG. 24 is a flowchart for describing an example of the operation of the training device according to the present disclosure.

Next, the operation of the training device 40 will be described with reference to the drawings. FIG. 24 is a flowchart for describing an example of the operation of the training device 40. In the description along the flowchart of FIG. 24, the training device 40 will be described as an operation subject.

In FIG. 24, first, the training device 40 acquires the motion data 410 regarding the training target motion (step S41).

Next, the training device 40 estimates posture data for each frame constituting the motion data 410 (step S42).

Next, the training device 40 normalizes posture data estimated for each frame included in the motion data 410 to angle expression (step S43).

Next, the training device 40 calculates the feature amount regarding the training target motion from the posture data (joint angle data set) normalized to the angle expression by the graph convolutional network (step S44).

Next, the training device 40 calculates a loss using the calculated feature amount (step S45).

Next, the training device 40 calculates a gradient using the calculated loss and trains the encoder 433 by machine training (step S46). When the training with all the moving image data is not completed (No in step S47), the process returns to step S41. When the training with all the moving image data is completed (Yes in step S47), the process according the flowchart in FIG. 24 is ended.

As described above, the training device according to the present example embodiment includes the acquisition unit, the estimation unit, the feature amount calculation unit, the loss calculation unit, and the training processing unit. The acquisition unit acquires training target motion data. The estimation unit estimates posture data from the training target motion data. The feature amount calculation unit includes an encoder including a graph convolutional network. The feature amount calculation unit normalizes posture data estimated for each frame constituting moving image data including a training target motion into an angle expression. The feature amount calculation unit inputs posture data normalized to the angle expression to the encoder and calculates a feature amount in the embedded space. The loss calculation unit calculates a loss according to the feature amount calculated by the encoder. The training processing unit trains the encoder based on the calculated loss gradient.

The training device of the present example embodiment trains the encoder based on the loss according to the feature amount regarding the posture data estimated for each frame constituting the training target motion data. The posture data is normalized to an angle expression. The feature amount is calculated for the embedded space. Therefore, according to the present example embodiment, the encoder can be trained in such a way that the motions included in the training target motion data can be synchronized with high accuracy without being affected by the background. By using the encoder trained by the training device of the present example embodiment, the motion data can be augmented even when there is no annotation such as a tag or metadata. By using this encoder, it is possible to augment motion data in which motion timings and speeds of various humans are aligned. The encoder trained by the training device of the present example embodiment can be used for data conversion for synchronizing a plurality of pieces of motion data including the target motion.

Fifth Example Embodiment

Figure 25:
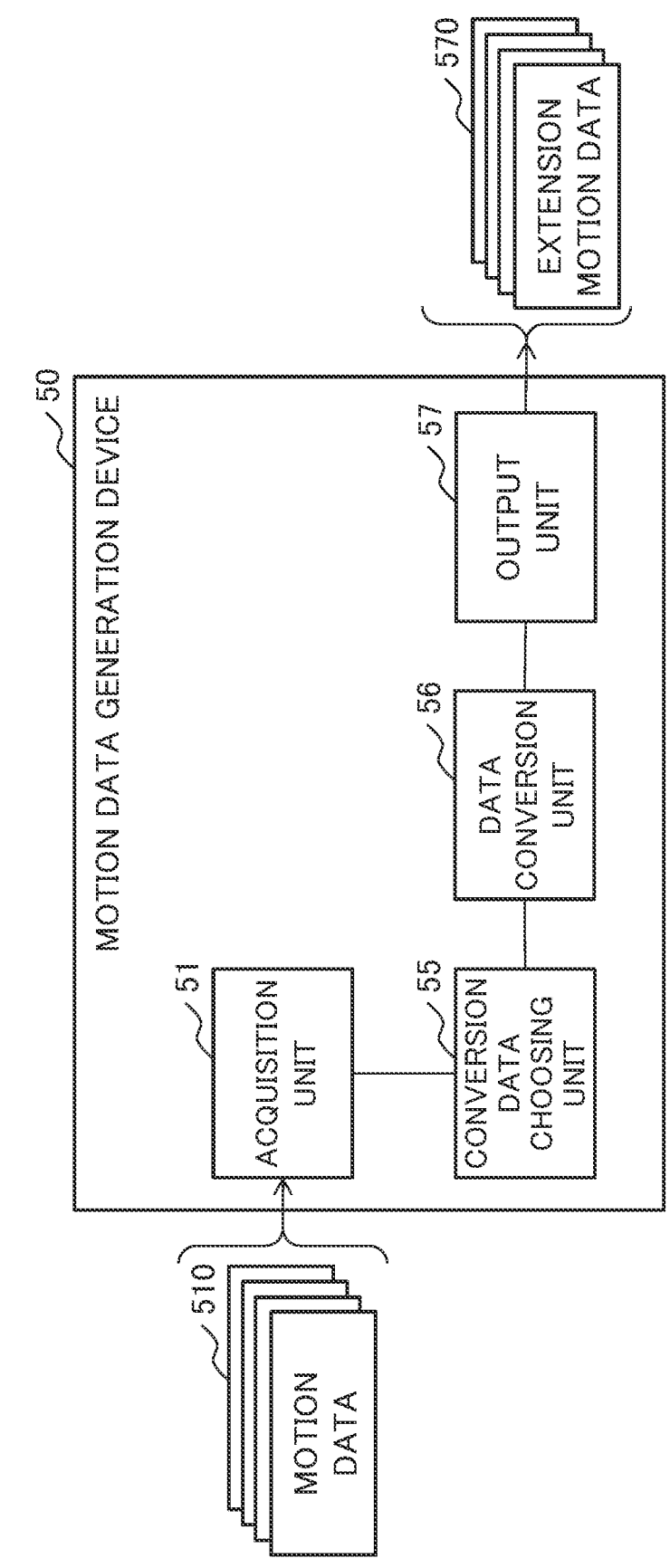
FIG. 25 is a block diagram illustrating an example of a configuration of a motion data generation device according to the present disclosure.

Next, a motion data generation device according to the fifth example embodiment will be described with reference to the drawings. The motion data generation device according to the present example embodiment has a configuration in which the motion data generation devices according to the first to third example embodiments are simplified. FIG. 25 is a block diagram illustrating an example of a configuration of a motion data generation device 50 according to the present example embodiment. The motion data generation device 50 includes an acquisition unit 51, a conversion data choosing unit 55, a data conversion unit 56, and an output unit 57.

The acquisition unit 51 acquires a plurality of pieces of motion data 510 to be data converted. The conversion data choosing unit 55 groups the plurality of pieces of motion data 510 for each motion class that is the target motion for data augmentation. The data conversion unit 56 sets at least one piece of the motion data 510 grouped for each motion class for the reference data. The data conversion unit 56 sets at least one piece of motion data 510 different from the reference data among the grouped motion data 510 for the data to be converted. The data conversion unit 56 generates extension motion data 570 in which the data to be converted is synchronized with reference to the motion timing of the reference data. The output unit 57 outputs the generated extension motion data 570.

The motion data generation device of the present example embodiment sets at least one piece of motion data different from the reference data for the data to be converted using at least one piece of motion data grouped for each motion class as the reference data. The motion data generation device according to the present example embodiment generates extension motion data in which the data to be converted is synchronized with reference to the motion timing of the reference data. Therefore, according to the present example embodiment, the motion data generation device of the present example embodiment can generate motion data augmented in the time axis direction.

(Hardware)

Next, a hardware configuration that executes control and process according to each example embodiment of the present disclosure will be described with reference to the drawings. An example of such a hardware configuration is an information processing device 90 (computer) in FIG. 26. The information processing device 90 in FIG. 26 is a configuration example for executing control and processing of each example embodiment, and does not limit the scope of the present disclosure.

Figure 26:
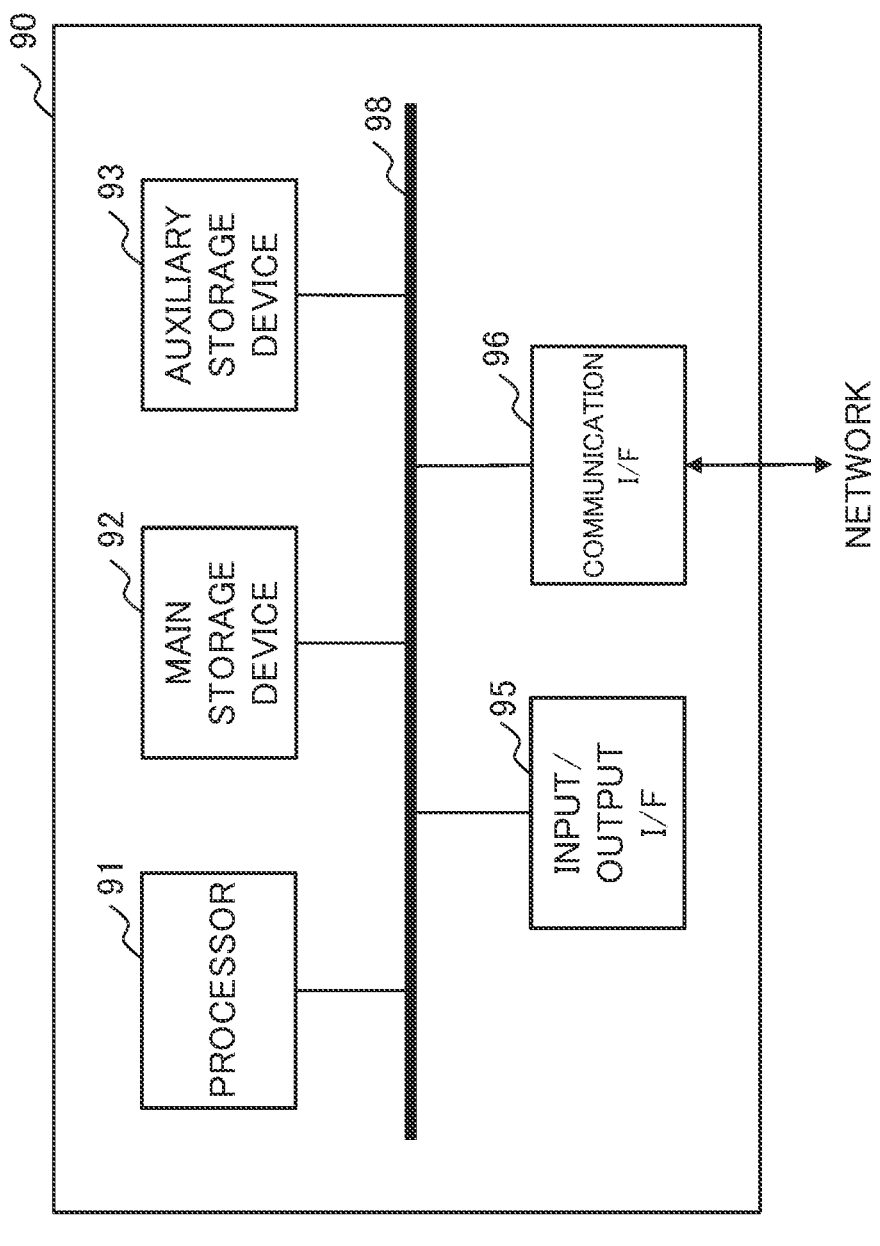
FIG. 26 is a block diagram illustrating an example of a hardware configuration that executes processing and control according to the present disclosure.

As illustrated in FIG. 26, the information processing device 90 includes a processor 91, a main storage device 92, an auxiliary storage device 93, an input/output interface 95, and a communication interface 96. In FIG. 26 the interface is abbreviated as an interface (I/F). The processor 91, the main storage device 92, the auxiliary storage device 93, the input/output interface 95, and the communication interface 96 are data-communicably connected to each other via a bus 98. The processor 91, the main storage device 92, the auxiliary storage device 93, and the input/output interface 95 are connected to a network such as the Internet or an intranet via the communication interface 96.

The processor 91 develops a program (instruction) stored in the auxiliary storage device 93 or the like in the main storage device 92. For example, the program is a software program for executing control and processing of each example embodiment. The processor 91 executes the program developed in the main storage device 92. The processor 91 executes the program to execute control and process according to each example embodiment.

The main storage device 92 has an area in which a program is developed. A program stored in the auxiliary storage device 93 or the like is developed in the main storage device 92 by the processor 91. The main storage device 92 is achieved by, for example, a volatile memory such as a dynamic random access memory (DRAM). As the main storage device 92, a nonvolatile memory such as a magnetoresistive random access memory (MRAM) may be configured/added.

The auxiliary storage device 93 stores various pieces of data such as programs. The auxiliary storage device 93 is achieved by a local disk such as a hard disk or a flash memory. Various pieces of data may be stored in the main storage device 92, and the auxiliary storage device 93 may be omitted.

The input/output interface 95 is an interface that connects the information processing device 90 with a peripheral device based on a standard or a specification. The communication interface 96 is an interface that connects to an external system or a device through a network such as the Internet or an intranet in accordance with a standard or a specification. As an interface connected to an external device, the input/output interface 95 and the communication interface 96 may be shared.

An input device such as a keyboard, a mouse, or a touch panel may be connected to the information processing device 90 as necessary. These input devices are used to input of information and settings. In a case where a touch panel is used as the input device, a screen having a touch panel function serves as an interface. The processor 91 and the input device are connected via the input/output interface 95.

The information processing device 90 may be provided with a display device that displays information. In a case where a display device is provided, the information processing device 90 includes a display control device (not illustrated) that controls display of the display device. The information processing device 90 and the display device are connected via the input/output interface 95.

The information processing device 90 may be provided with a drive device. The drive device mediates reading of data and a program stored in a recording medium and writing of a processing result of the information processing device 90 to the recording medium between the processor 91 and the recording medium (program recording medium). The information processing device 90 and the drive device are connected via an input/output interface 95.

The above is an example of a hardware configuration for enabling control and process according to each example embodiment of the present disclosure. The hardware configuration of FIG. 26 is an example of a hardware configuration that executes control and process according to each example embodiment, and does not limit the scope of the present disclosure. A program for causing a computer to execute control and process according to each example embodiment is also included in the scope of the present disclosure.

A program recording medium in which the program according to each example embodiment is recorded is also included in the scope of the present disclosure. The recording medium can be achieved by, for example, an optical recording medium such as a compact disc (CD) or a digital versatile disc (DVD). The recording medium may be achieved by a semiconductor recording medium such as a Universal Serial Bus (USB) memory or a secure digital (SD) card. The recording medium may be achieved by a magnetic recording medium such as a flexible disk, or another recording medium. In a case where the program executed by the processor is recorded in the recording medium, the recording medium is a program recording medium.

The components of each example embodiment may be combined in any manner. The components of each example embodiment may be implemented by software. The components of each example embodiment may be implemented by a circuit.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A motion data generation device comprising:

a memory storing instructions, and a processor connected to the memory and configured to execute the instructions to:

acquire a plurality of pieces of motion data to be data converted;

group the plurality of pieces of motion data into one or more of a plurality of motion classes, each motion class representing a different type of target motion for data augmentation;

set, for each motion class, at least one piece of the motion data grouped for each motion class as reference data;

set, for each motion class, at least one piece of the motion data different from the reference data among the grouped motion data as data to be converted;

generate extension motion data in which the data to be converted is synchronized with reference to motion timing of the reference data within each motion class; and output the generated extension motion data, wherein the processor is configured to execute the instructions to group the plurality of motion data into a plurality of clusters by a predetermined clustering method, pair two of the clusters included in the plurality of clusters grouped according to the number of pieces of the motion data included in the clusters, randomly extract at least one piece of the motion data from each of the paired two clusters, pair the motion data extracted from each of the two clusters, and generate the extension motion data in which the paired motion data is synchronized with each other, and wherein the processor is configured to execute the instructions to calculate an inverse ratio from a ratio of the number of pieces of the motion data included in the plurality of clusters, and pair a cluster having a maximum calculated inverse ratio value and any one of the clusters having a non-maximum inverse ratio value.

2. The motion data generation device according to claim 1, wherein the processor is configured to execute the instructions to set all pieces of the motion data grouped for each motion class for the reference data, set all pieces of the motion data different from the reference data among the grouped motion data for the data to be converted, and generate the extension motion data in which all pieces of the data to be converted set for the reference data are synchronized with each other with reference to motion timings of all pieces of the reference data.

3. The motion data generation device according to claim 1, wherein the processor is configured to execute the instructions to extract a preset number of samples from the plurality of pieces of motion data, calculate an index value representing a relationship between samples with respect to the extracted samples, pair the motion data to be converted according to the index value, and generate the extension motion data in which the paired motion data is synchronized with each other.

4. The motion data generation device according to claim 3, wherein the processor is configured to execute the instructions to calculate a degree of similarity between samples as the index value, and pair two pieces of the motion data having a degree of similarity smaller than a preset similarity degree threshold value.

5. The motion data generation device according to claim 3, wherein the processor is configured to execute the instructions to calculate a distance between samples as the index value, and pair two pieces of the motion data having a distance larger than a preset distance threshold value.

6. The motion data generation device according to claim 1, wherein the processor is configured to execute the instructions to normalize posture data estimated for each frame constituting motion data including a target motion to an angle expression, calculate a feature amount in an embedded space by input the posture data normalized to the angle expression to an encoder including a graph convolutional network, calculate a distance between a feature amount calculated for each frame constituting the reference data and a feature amount calculated for each frame constituting synchronization target data, and calculate an optimal path for each frame based on the calculated distance, and synchronize the synchronization target data with the reference data by aligning timing of frames connected by the optimal path, wherein the encoder is configured to convolve the posture data normalized to an angle expression by graph convolution, and output embedding in an embedded space as a feature amount, and wherein the processor is configured to execute the instructions to calculate a distance between a feature amount related to a frame constituting the reference data and a feature amount related to a frame constituting the synchronization target data in a brute-force manner.

7. A motion data generation method executed by a computer, the method comprising:

acquiring a plurality of pieces of motion data to be data converted;

grouping the plurality of pieces of motion data into one or more of a plurality of motion classes, each motion class representing a different type of target motion for data augmentation;

setting, for each motion class, at least one piece of the motion data grouped for each motion class as reference data;

setting, for each motion class, at least one piece of the motion data different from the reference data among the grouped motion data as data to be converted;

generating extension motion data in which the data to be converted is synchronized with reference to motion timing of the reference data within each motion class; and outputting the generated extension motion data, wherein grouping the plurality of motion data into a plurality of clusters by a predetermined clustering method, pairing two of the clusters included in the plurality of clusters grouped according to the number of pieces of the motion data included in the clusters, randomly extracting at least one piece of the motion data from each of the paired two clusters, pairing the motion data extracted from each of the two clusters, and generating the extension motion data in which the paired motion data is synchronized with each other, and wherein calculating an inverse ratio from a ratio of the number of pieces of the motion data included in the plurality of clusters, and pairing a cluster having a maximum calculated inverse ratio value and any one of the clusters having a non-maximum inverse ratio value.

8. A non-transitory recording medium storing a program for causing a computer to execute the steps of:

acquiring a plurality of pieces of motion data to be data converted;

grouping the plurality of pieces of motion data into one or more of a plurality of motion classes, each motion class representing a different type of target motion for data augmentation;

setting, for each motion class, at least one piece of the motion data grouped for each motion class as reference data;

setting, for each motion class, at least one piece of the motion data different from the reference data among the grouped motion data as data to be converted;

generating extension motion data in which the data to be converted is synchronized with reference to motion timing of the reference data within each motion class; and outputting the generated extension motion data, wherein grouping the plurality of motion data into a plurality of clusters by a predetermined clustering method, pairing two of the clusters included in the plurality of clusters grouped according to the number of pieces of the motion data included in the clusters, randomly extracting at least one piece of the motion data from each of the paired two clusters, pairing the motion data extracted from each of the two clusters, and generating the extension motion data in which the paired motion data is synchronized with each other, and wherein calculating an inverse ratio from a ratio of the number of pieces of the motion data included in the plurality of clusters, and pairing a cluster having a maximum calculated inverse ratio value and any one of the clusters having a non-maximum inverse ratio value.

\* \* \* \* \*